(12) United States Patent
Hijazi et al.

(10) Patent No.: US 9,791,906 B2
(45) Date of Patent: Oct. 17, 2017

(54) INFORMATION HANDLING SYSTEM MULTI-PURPOSE CONNECTOR GUIDE PIN STRUCTURE

(71) Applicant: Dell Products L.P., Round Rock, TX (US)

(72) Inventors: Mohammed K. Hijazi, Austin, TX (US); Merle J. Wood, III, Round Rock, TX (US); Deeder M. Aurongzeb, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 271 days.

(21) Appl. No.: 14/547,517

(22) Filed: Nov. 19, 2014

(65) Prior Publication Data

US 2016/0139641 A1    May 19, 2016

(51) Int. Cl.
| | | |
|---|---|---|
| G06F 1/26 | (2006.01) | |
| G06F 1/32 | (2006.01) | |
| H01R 31/00 | (2006.01) | |
| G06F 1/16 | (2006.01) | |
| H01R 13/04 | (2006.01) | |
| H01R 12/72 | (2011.01) | |
| H01R 24/28 | (2011.01) | |
| H01R 13/631 | (2006.01) | |
| H01R 24/60 | (2011.01) | |

(52) U.S. Cl.
CPC ............. *G06F 1/26* (2013.01); *G06F 1/1632* (2013.01); *G06F 1/1635* (2013.01); *H01R 31/00* (2013.01); *G06F 1/1613* (2013.01); *G06F 1/266* (2013.01); *G06F 1/3287* (2013.01); *H01R 12/722* (2013.01); *H01R 13/04* (2013.01); *H01R 13/631* (2013.01); *H01R 24/28* (2013.01); *H01R 24/60* (2013.01); *H01R 2201/06* (2013.01)

(58) Field of Classification Search
CPC ........ G06F 1/26; G06F 1/1632; G06F 1/1613; G06F 1/266; G06F 1/3287; H01R 12/722; H01R 13/04; H01R 24/28; H01R 24/4326
USPC ................................ 713/300, 320, 330, 340
See application file for complete search history.

(56) References Cited

U.S. PATENT DOCUMENTS

| | | |
|---|---|---|
| 4,272,806 A | 6/1981 | Metzger |
| 5,805,417 A | 9/1998 | Nakagawa et al. |
| 5,954,523 A | 9/1999 | Babcock |
| 6,422,892 B1 | 7/2002 | Chen et al. |
| 6,566,844 B1 | 5/2003 | Schlicht |
| 7,175,443 B2 | 2/2007 | Mizuno et al. |
| 7,186,121 B1 | 3/2007 | Costello et al. |
| 7,865,629 B1 | 1/2011 | Tantos et al. |
| 7,877,618 B2 | 1/2011 | Lewis et al. |
| 8,237,414 B1 | 8/2012 | Li et al. |

(Continued)

*Primary Examiner* — Michael J Brown
(74) *Attorney, Agent, or Firm* — Terrile, Cannatti, Chambers & Holland, LLP; Robert W. Holland

(57) ABSTRACT

A USB Type C connector port adapts to support docking solutions with enhanced power transfer features, including increased power transfer levels supported through a guide pin and connector interface, rapid power transfer configuration changes by applying pre-negotiated power settings, external battery charge and discharge at an information handling system with improved efficiency accomplished by transitioning voltage between native and boosted levels responsive to information handling system load, and robust connector port coupling in a cavity of a connector shell.

16 Claims, 18 Drawing Sheets

(56) References Cited

U.S. PATENT DOCUMENTS

| | | |
|---|---|---|
| 9,099,759 B2 | 8/2015 | Caldwell et al. |
| 2004/0182938 A1 | 9/2004 | Chen et al. |
| 2006/0039402 A1 | 2/2006 | Ross |
| 2008/0164845 A1 | 7/2008 | Choi |
| 2009/0063877 A1 | 3/2009 | Lewis et al. |
| 2009/0104799 A1 | 4/2009 | Liu et al. |
| 2009/0269947 A1 | 10/2009 | Costello |
| 2009/0307507 A1 | 12/2009 | Bennett |
| 2010/0150572 A1 | 6/2010 | Lee et al. |
| 2010/0248547 A1 | 9/2010 | Sidiki et al. |
| 2011/0006603 A1 | 1/2011 | Robinson et al. |
| 2011/0016333 A1 | 1/2011 | Scott et al. |
| 2011/0116807 A1 | 5/2011 | Park et al. |
| 2011/0123144 A1 | 5/2011 | Wang et al. |
| 2011/0191480 A1 * | 8/2011 | Kobayashi ............. H01R 11/00 709/227 |
| 2011/0208980 A1 | 8/2011 | Brooks et al. |
| 2012/0071032 A1 | 3/2012 | Tsai |
| 2012/0169126 A1 | 7/2012 | Totterman et al. |
| 2013/0022320 A1 | 1/2013 | Chang |
| 2013/0051737 A1 | 2/2013 | Chang |
| 2013/0103966 A1 | 4/2013 | Liu |
| 2013/0175979 A1 | 7/2013 | Chang |
| 2013/0254580 A1 | 9/2013 | Yan |
| 2013/0265384 A1 | 10/2013 | Shoemake et al. |
| 2013/0339769 A1 | 12/2013 | Waters |
| 2014/0095899 A1 | 4/2014 | Sultenfuss et al. |
| 2014/0145679 A1 | 5/2014 | Chen |
| 2014/0183974 A1 | 7/2014 | Proefrock et al. |
| 2014/0203761 A1 | 7/2014 | Paparrizos et al. |
| 2014/0208134 A1 * | 7/2014 | Waters ................. G06F 13/385 713/310 |
| 2014/0220825 A1 | 8/2014 | Chang |
| 2014/0258738 A1 * | 9/2014 | Greenwalt ............ G06F 1/3206 713/300 |
| 2014/0339902 A1 | 11/2014 | Sepe, Jr. et al. |
| 2014/0340062 A1 | 11/2014 | Jain et al. |
| 2015/0025390 A1 | 1/2015 | Hewitt et al. |
| 2015/0028684 A1 | 1/2015 | Harrison et al. |
| 2015/0042300 A1 | 2/2015 | Peker et al. |
| 2015/0160705 A1 | 6/2015 | Chen |
| 2015/0205337 A1 | 7/2015 | Zhao |
| 2015/0363339 A1 | 12/2015 | Huang et al. |

* cited by examiner

INFORMATION HANDLING SYSTEM MULTI-PURPOSE CONNECTOR GUIDE PIN STRUCTURE

CROSS REFERENCE TO RELATED APPLICATIONS

U.S. patent application Ser. No. 14/547,507, entitled "Information Handling System Multi-Purpose Connector Guide Pin Structure," by inventors Mohammed K. Hijazi, Christopher A. Torres, Merle J. Wood III, and Deeder M. Aurongzeb, filed on Nov. 19, 2014, now U.S. Pat. No. 9,501,118, issued Nov. 22, 2016, describes exemplary methods and systems and is incorporated by reference in its entirety.

U.S. patent application Ser. No. 14/547,529, entitled "Information Handling System Multi-Purpose Connector Guide Pin Structure," by inventors Mohammed K. Hijazi, Merle J. Wood III, Deeder M. Aurongzeb, and Richard C. Thompson, filed on Nov. 19, 2014, describes exemplary methods and systems and is incorporated by reference in its entirety.

U.S. patent application Ser. No. 14/547,545, entitled "Information Handling System Multi-Purpose Connector Guide Pin Structure," by inventors Mohammed K. Hijazi, Christopher A. Torres, Merle J. Wood III, and Deeder M. Aurongzeb, filed on Nov. 19, 2014, describes exemplary methods and systems and is incorporated by reference in its entirety.

BACKGROUND OF THE INVENTION

Field of the Invention

The present invention relates in general to the field of information handling system connectors, and more particularly to an information handling system multi-purpose connector guide pin structure.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Over time, information handling systems have packed ever-greater processing capabilities into ever-smaller housings. End users have migrated to mobile information handling systems in increasing numbers as improved processing capabilities have allowed mobile information handling systems to take on computing tasks of greater complexity. Over the past several years, mobile telephone information handling systems have become a common tool for enterprises and individuals to obtain e-mail and to basic Internet communications. End users have also found tablet information handling systems a convenient tool for performing basic computing functions while traveling. For example, the larger screen typically included with a tablet information handling system and a detachable keyboard provides a convenient tool for basic word processing tasks. The availability of small but powerful mobile information handling systems has spurred a greater interest by end users in more powerful laptop or "convertible" information handling systems that provide both mobility and processing capability to perform more intense processing tasks common to an office environment. As a result, information handling system manufacturers have attempted to reduce the physical footprint and weight of clamshell and convertible information handling systems without sacrificing processing capability.

The shift towards information handling systems having a lower form factor has run against two prominent difficulties: power and durability. Although processing components tend to decrease in size and increase in capability over time, batteries for powering mobile devices tend to have a given size for the amount of power stored that has not decreased substantially. As a result, information handling system manufacturers have attempted to reduce the amount of power that processing components consume so that the size of the battery can remain as small as practical. Typically, mobile information handling systems will rely on a single physical connector that provides both a data and a power interface, such as a microUSB connector. Generally, such connectors have a more limited power transfer capability than is found in conventional power adapters. In some cases, end users will plug in an external battery that couples to the information handling system housing to add battery life to the system. The smaller form factor used on many mobile information handling systems tends to reduce the ability of the systems to survive mechanical stresses, such as falling or vibrations experienced during typical usage scenarios. Generally, in order to build housings with the thin form factors demanded by consumers, manufacturers rely on specialized materials and designs that minimize system thickness. Such designs tend to have weak points around locations that intersect with external connectors, such as a charging connector. In some instances, the connector has nearly the thickness of the housing itself—which is often still quite thin. In addition to presenting a mechanical weakness, such connectors often are not user friendly in that aligning a cable into a connector having a small footprint sometimes presents a challenge to an end user.

To address restricted power delivery and the limited availability of connector ports on the small housing footprint of mobile information handling systems, industry has begun development of a Type C Universal Serial Bus (USB) connector. Type C USB provides a low profile connector that supports data, video and power delivery with a reversible form factor that allows cable insertion in multiple orientations. Type C USB is designed for USB 3.1 information transfer at rates of up to 20 Gps per land and up to 100 W of power delivery. Type C USB is a candidate for universal docking station connector that is scalable from small systems, such as the Dell Venue, to larger systems, such as the Dell Precision, with docking manageability through a transport channel and with host to device authentication. Although the Type C USB connector provides a generalized approach that addresses many mobile information handling system power and data requirements in a small-footprint form factor, its small size restricts structural strength and power transfer.

SUMMARY OF THE INVENTION

Therefore a need has arisen for a system and method which aids coupling to a connector port and enhances power transfer.

A further need exists for a system and method which negotiates power transfer settings to rapidly adapt power transfers in direction and source at one or more connector ports.

A further need exists for a system and method which enhances power transfer efficiency from an external battery source to an information handling system by adapting transfer voltage to information handling system load.

A further need exists for a system and method that enhances connector port strength in small footprint information handling systems.

In accordance with the present invention, a system and method are provided which substantially reduce the disadvantages and problems associated with previous systems and methods for using connector ports disposed in information handling systems. In one embodiment, a connector port is integrated in an information handling system housing with guide connectors disposed in the housing proximate but external to the connection port. The guide connectors accept guide pins of a docking connector or cable connector. A controller disposed in the information handling system coordinates power transfer to the information handling system through the connector port and/or the guide pins to the guide connectors. Enhanced power transfer is provided through the guide pins relative to power available for transfer through the connector port. In one embodiment, power transfer settings are pre-negotiated so that power transfers may rapidly change in direction from versus to the information handling system and between the guide pins as a source and the connector port as a source. Pre-negotiated settings allow power transfer changes to apply without performing a power transfer negotiation protocol, such as that defined by the Universal Serial Bus (USB) standard.

In another embodiment, power transfer efficiency is enhanced where an external battery interfaces with an information handling system to provide battery power. Power transfer voltages are adjusted between a boosted voltage and native voltage based upon the load at the information handling system. At high loads, communication between the battery and information handling system routes power through a charger circuit that boost voltage to allow a greater power transfer rate at the cost of reduced efficiency. At reduced loads that are supported with a power transfer at the native voltage of the battery, a bypass switch routes power through a bypass circuit that bypasses the charger so that power transfer is provided at the native voltage with a corresponding increase in efficiency.

In another embodiment, connector port installation at an information handling system has increased robustness and replaceability by installing a connector port in a cavity of a connector shell. The connector port interfaces with an intermediary board in the cavity, which in turn interfaces with pads or spring clips exposed at the external surface of the connector shell. The pads or spring clips interface with pads disposed on a circuit board when the connector shell couples to the circuit board. Failure of the connector port is thus addressed by removing the connector port from the connector shell cavity rather than having to replace a circuit board to which the connector port is soldered.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system enhances power transfer with guide pins and guide connectors disposed proximate a connector port. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
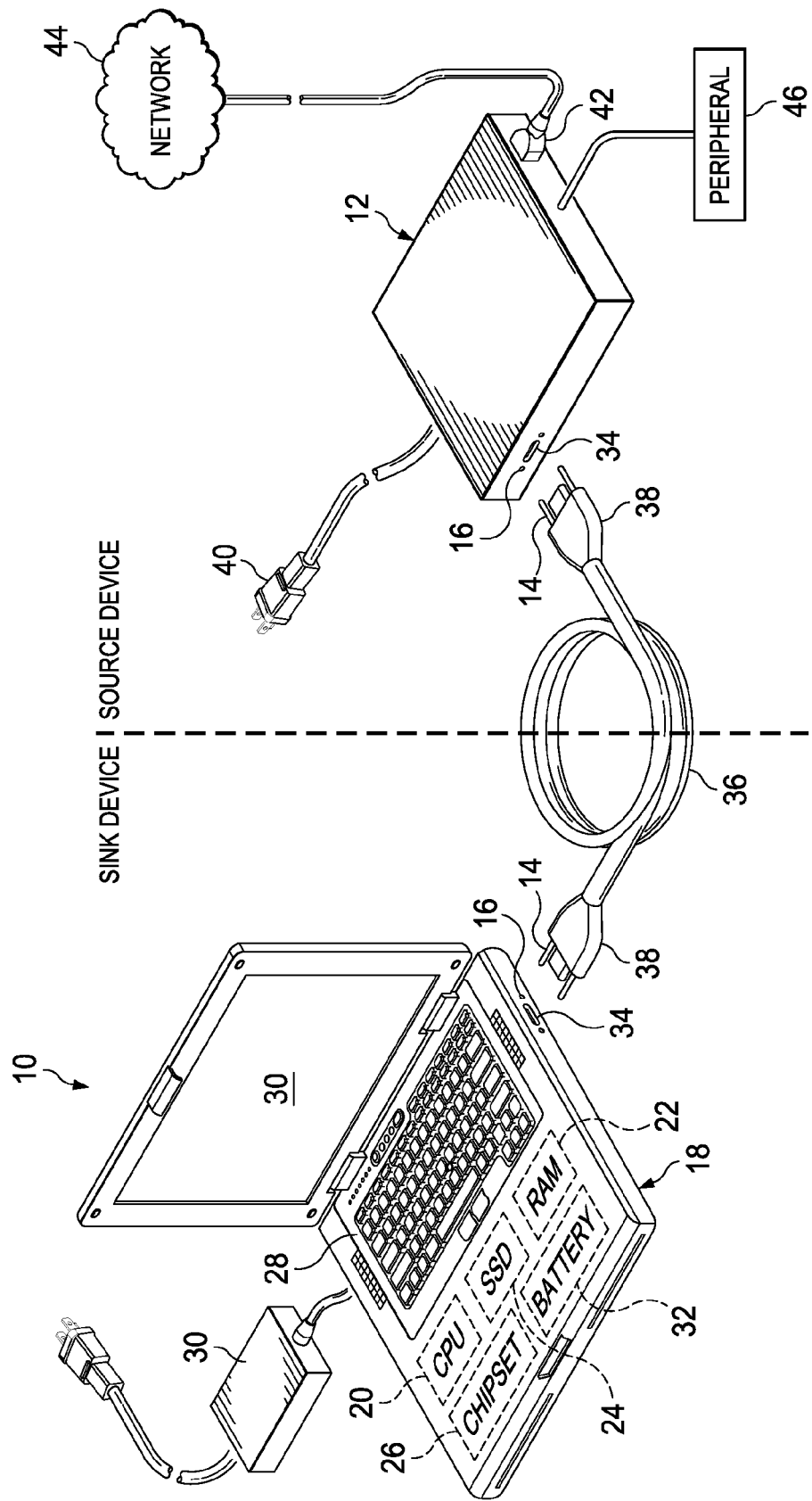
FIG. 1 depicts a portable information handling system configured to assemble with a docking station to receive power through guide pins and guide connectors.

Referring now to FIG. 1, a portable information handling system 10 is depicted as configured to assemble with a docking station 12 to receive power through guide pins 14 and guide connectors 16. Information handling system 10 processes information with components disposed in a housing 18, such as a central processing unit (CPU) 20 that executes instructions in random access memory (RAM) 22 to process information stored in RAM 22. Applications that include instructions and information are stored in persistent memory, such as a solid state drive (SSD) 24 or hard disk drive, and are booted to an operational state with firmware instructions stored in a chipset 26, such as a BIOS. Chipset 26 coordinates the interaction between components of information handling system 10, such as with memory controllers, keyboard controllers, peripheral controllers and other processing devices and firmware instructions. For example, chipset 26 coordinates inputs made by an end user at an integrated keyboard 28 or touchscreen display 30, and coordinates the presentation of information as images at display 30, such as with a graphics controller. In the example embodiment, information handling system 10 is depicted as a portable "laptop" configuration with display 30 rotationally coupled to housing 18. In alternative embodiments information handling system 10 may have alternative form factors, such as tablet, smartphone or desktop configurations.

Portable information handling system 10 operates using external power, such as from an external power adapter 30, and internal power, such as from an integrated battery 32. A power manager supported from chipset 26 applies external power to charge battery 32 and otherwise manages power consumption by components within information handling system 10. In addition to receiving power from external power adapter 30, portable information handling system 10 receives power from a connector port 34 that provides both power and data transfers from a source device, such as docking station 12. In the example embodiment, connector port 34 is a Type C USB 3.1 port that provides 20 Gbps/lane of data transfers and 100 W of power delivery. In alternative embodiments, alternative types of ports may be used. A connector cable 36 includes a connector 38 sized to fit into connector port 34, such as a Type C USB 3.1 connector. In the example embodiment, connector cable 36 has connectors 38 on opposing ends so that one connector 38 fits into a connector port 34 disposed at the outer surface of housing 18 and the other connector 38 fits into a connect port 34 disposed at docking station 12. In alternative embodiments, information handling system 10 may include a connector port 34 on its bottom or rear surface that couples with a connector 38 disposed at an upper surface of docking station 12 so that placing information handling system 10 on docking station 12 results in a communications and power interface between connector port 34 and connector 38. Docking station 12 interfaces information handling system 10 with docking station resources through the connector port 34 interface, such as external power 40, an Ethernet connector 42 interfaced with a network 44, and peripherals like a keyboard, mouse, display, etc. . . . .

In order to provide guidance to an end user to insert a connector 38 into a connector port 34, guide pins 14 extend outward from connector 38 to align with guide connectors 16 proximate connector port 34. Guide pins 14 insert into guide connectors 16 before connector 38 contacts connector port 34 so that an end user may press connector 38 into place without precise adjustments typically needed with smaller sized connectors and ports. In addition to guiding a connector into a port, guide pins 14 provide an indication and/or detection of an interface between a docking station 12 and information handling system 10, such as by bringing a small detection signal to ground when a guide pin contacts a guide connector portion within information handling system 10 that corresponds to complete insertion. Detection of a complete insertion of connector 38 into port 34 may initiate power and other docking functionality independent of communications between connector 38 and port 34. For example, upon complete insertion information handling system 10 and docking station 12 cooperate to change guide pins 14 from a ground interface and/or detection signal interface to a full power transfer interface with power and ground contacts established by one or both guide pins 14. Upon removal of guide pins 14 from a power transfer position, such as by a partial withdrawal from guide connectors 16, high power transfer is halted and a power portion of the guide pin 14 is grounded. In one embodiment, communications through connector 38 and connector port 34 are established and maintained to control application of power through guide pins 14 with power transfer through guide pins 14 cut off if communications through connector 38 and connector port 34 are cut off. In one embodiment, power transfer through guide pins 14 is provided in two directions by defining each device interfaced through cable 36 as a sink device or source device based upon which device needs power. For example, information handling system 10 may act as a sink device to receive power when coupled to docking station 12 and act as a source device to provide power when coupled to a smartphone or tablet.

Figure 2:
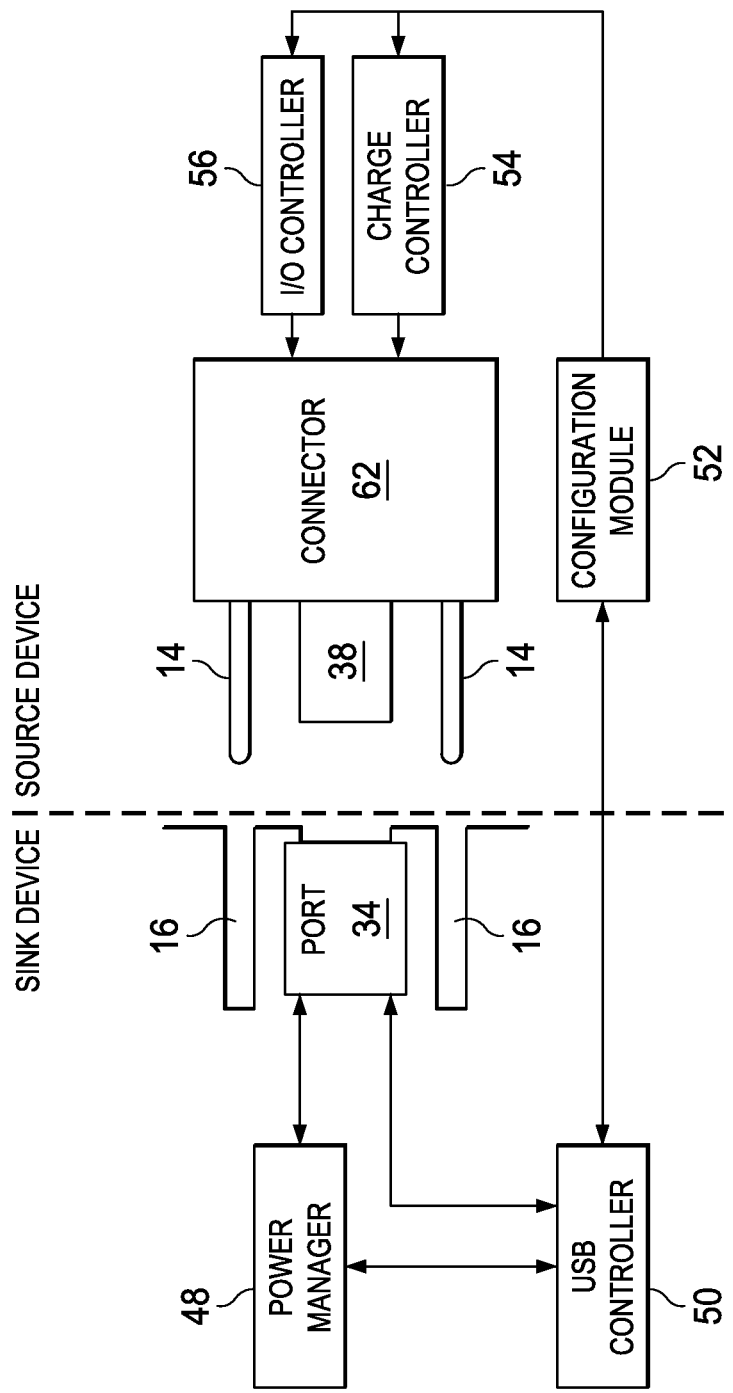
FIG. 2 depicts a functional block diagram for managing power transfer through guide pins and guide connectors disposed external to a connector port and cable connector.

Referring now to FIG. 2, a functional block diagram depicts managing power transfer through guide pins 14 and guide connectors 16 disposed external to a connector port 34 and cable connector 38. Connector 38 is placed relative to guide pins 14 so that guide pins 14 insert into guide connectors 16 before connector 38 inserts into port 34. In the example embodiment, the sink device includes a power manager 48, such as a firmware module running on a chipset processor, that manages power accepted at the sink device and a USB controller 50 that manages power and data transactions through port 34. In alternative embodiments, other types of protocols may be used at port 34, including protocols that transfer power and do not transfer power. USB controller 50 interfaces with a configuration module 52 of the source device, which manages a charger controller 54 to provide power to the sink device and an I/O controller 56 to manage data transactions with the sink device. For example, as connector 38 comes into contact with port 34, USB controller 50 transitions guide pins 14 from their role of aiding a port connection to power transfer role. By biasing guide pins 14 to ground and allowing power transfer after a connection, inadvertent end user contact with a high power portion of an exposed guide pin 14 is prevented.

In operation, power manager 48 manages transitions of guide pins 14 to and from a power transfer role in coordination with USB controller 50 based upon a confirmation of the availability of the power transfer role, detection of complete insertion of the guide pins 14 into guide connectors 16, the need for power at the sink device, the availability of power through port 34 compared with power demands at the sink device, the impact of power transfer on signal integrity at port 34 and other factors as appropriate. For example, if the sink device is using more power than is available through connector 38, then power manager 48 requests that USB controller 50 communicate with configuration module 52 to initiate power transfer through guide pins 14. As another example, USB controller 50 may initiate power transfer through guide pins 14 in order to cut off power transfer through connector 38. Since guide pins 14 are external to connector 38 and guide connectors 16 are external to port 34, improved signal integrity may be obtained in different situations by adjusting power transfer in whole or in part between guide pins 14 and guide connectors 16 or between connector 38 and port 34. In alternative embodiments, power manager 48 may independently control power application at guide pins 14 by coordinating with configuration module 52 using a sense signal and ground interaction through guide pins 14 without coordination through port 34 and connector 38. For instance, automated power transactions may take place when the sink device is powered down so that USB controller 50 is not available.

Figure 3A:
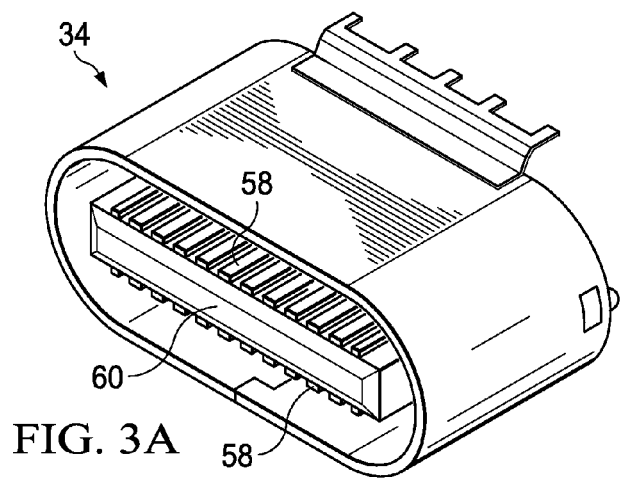
FIGS. 3A, 3B, and 3C (referred to generally as FIG. 3) depict side and perspective views of a Type C USB connector.
Figure 3B:
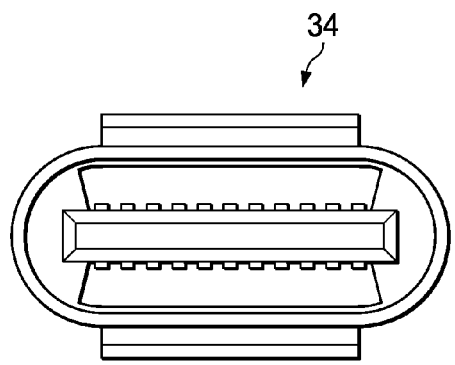
Figure 3C:
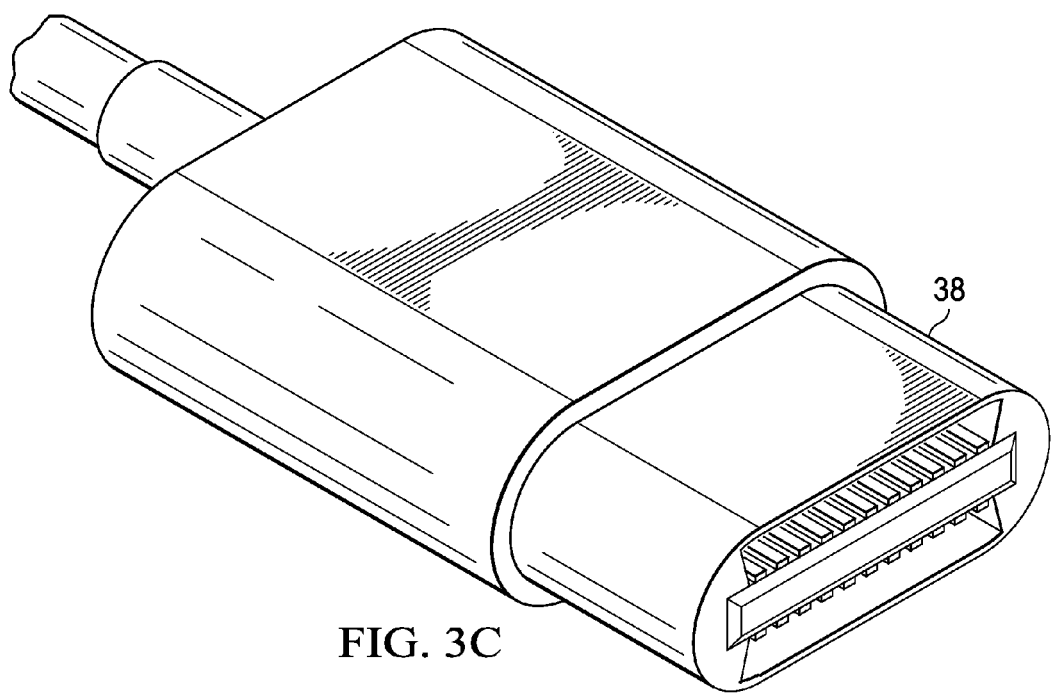

Referring now to FIG. 3, side and perspective views depict a Type C USB port 34 and connector 38. Port 34 has a set of pins 58 disposed along its length above and below a central support 60. Connector 38 has pins aligned along its inner diameter to couple with port pins 58 in reversible orientations so that connector 38 may couple to port 34 whichever way that the end user happens to plug in connector 38. In the various embodiments disclosed herein for guide pins 14 and guide connectors 16, the guide pins and connectors are place external but proximate to the connector 38 and port 34 structures. Guide pins 14 and guide connectors 16 are configured to operate in a reversible manner so that either guide pin 14 may insert in either guide connector 16 and still perform the power transfer functions. The reversible power configuration of guide pins 14 may be provided by symmetrical power and ground connection points on opposing guide pins 14 and guide connectors 16 or by identifying the orientation of the connector when inserted, such as with a sense signal or based upon the orientation of the connector in the port, and configuring the guide pins accordingly.

Figure 4A:
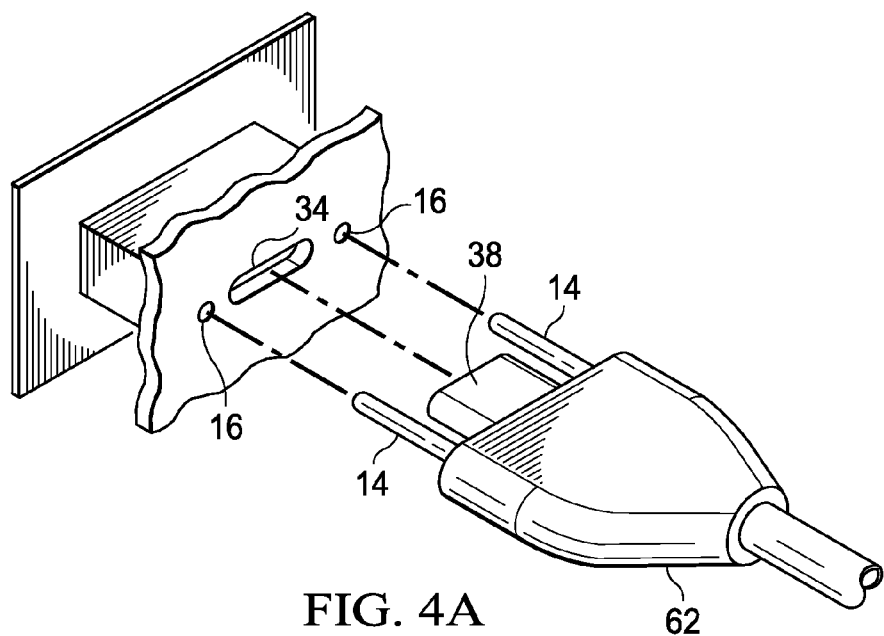
FIGS. 4A, 4B, and 4C (referred to generally as FIG. 4) depict perspective, front and sectional views of a Type C USB connector configured to include guide pins for power transfer.
Figure 4B:
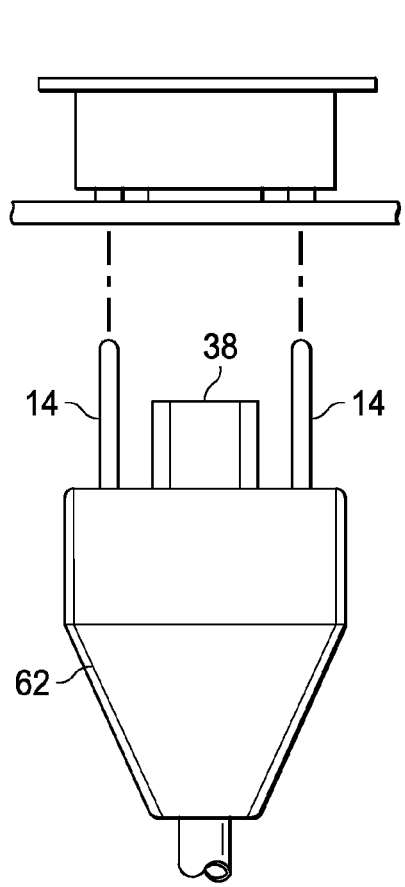
Figure 4C:
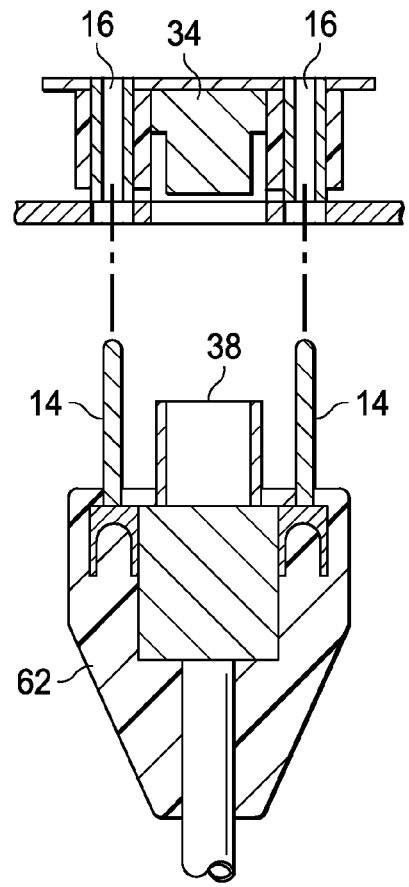

Referring now to FIG. 4, perspective, front and sectional views of a Type C USB connector 38 configured to include guide pins 14 for power transfer. Guide pins 14 extend past the end of connector 38 to insert into guide connectors 16 before connector 38 inserts into port 34. The interaction of guide pins 14 with guide connectors 16 aligns connector 38 into port 34 to provide the end user with a physical reference for the insertion process. Guide pins 14 are structurally coupled with plug 62 to establish relative alignment to connector 38, however guide pins 14 are external to the standardized form factor of connector 38. Similarly, guide connectors 16 are structurally coupled to the housing proximate port 34, however, guide connectors 16 are external to the standardized from factor of port 34 so that a connector 38 without guide pins will interface with port 34 in a standard manner. While guide pins 14 are exposed, both guide pins 14 are biased to ground. Upon detection of complete insertion, such as with a sense signal at the base of guide connector 16 or an active interface between port 34 and connector 38, one of the guide pins 14 becomes a power pin that communicates power to the guide connector 16. The selection of the guide pin 14 that provides power may be configured from the source device or may be set so that the guide connectors 16 selectively switch between power and ground modes. An advantage of using guide pins 14 and guide connectors 16 to communicate power instead of pins internal to connector 38 and port 34 is that a reduction in cable IR drop may be obtained for improved signal integrity margins for high speed interfaces running through the same cable.

Figure 5A:
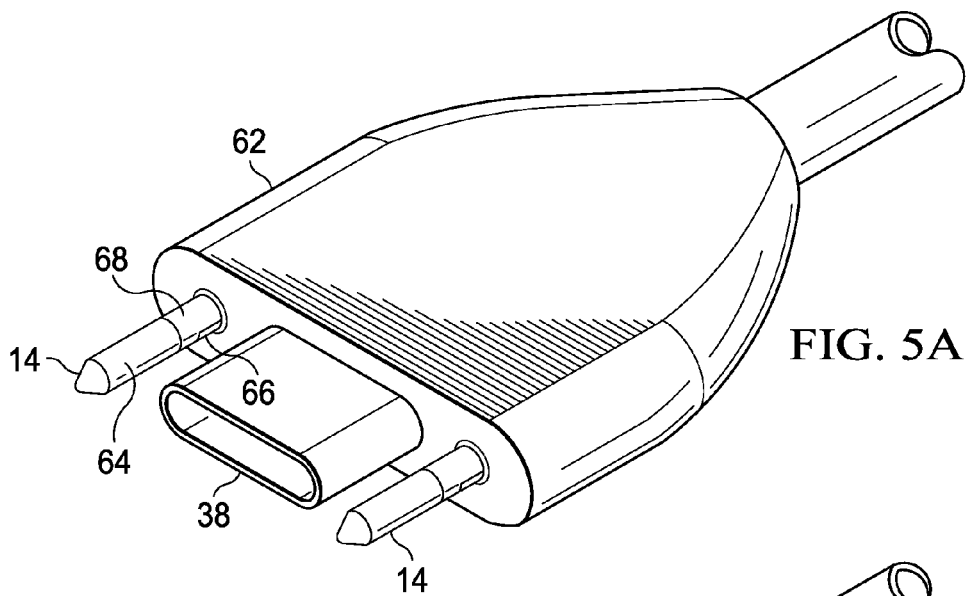
FIGS. 5A-5B (referred to generally as FIG. 5) depict a perspective and blown up view of a Type C USB connector configured to provide power and ground through a common guide pin.
Figure 5B:
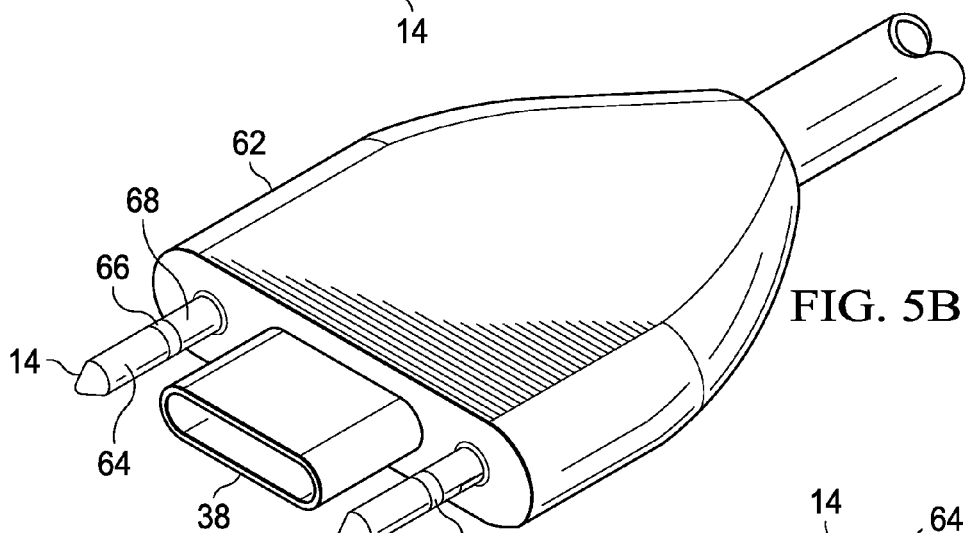

Referring now to FIG. 5, a perspective and blown up view depict a Type C USB connector configured to provide power and ground through a common guide pin. Each guide pin 14 includes a ground portion 64, a power portion 66 and an insulator portion 68 so that power transfers may be provided through a single guide pin 14 to a single guide connector 16 that has corresponding ground and power portions. In one embodiment, plug 62 may be built with a single guide pin 14 instead of two. Alternatively, if a greater amount of power is needed then both guide pins 14 may provide power. Power portion 68 is included proximate connector 38 on the inner portion of the diameter so that a reduced area helps to prevent inadvertent contact with the power portion. In one embodiment, power portion 68 has a small voltage sense signal that allows a corresponding power portion within guide connector 16 to detect insertion and enable power transfer, such as when USB communications are not active at port 34.

Figure 6:
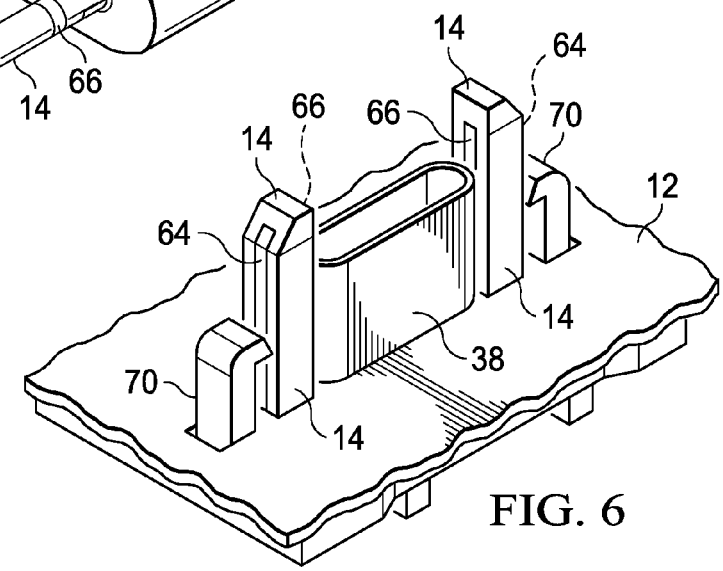
FIG. 6 depicts a perspective view of a Type C connector with guide pins and connectors proximately located that provide power transfer.

Referring now to FIG. 6, a perspective view depicts a Type C connector 38 with guide pins 14 and connectors 16 proximately located that provides power transfer. In the example embodiment of FIG. 6, a clip connector 70 extends outward from a docking station 12 to engage an information handling system 10 in a docked position. Guide pins 14 have an outer ground portion 64 and an inner power portion 66 that interface with corresponding ground and power portions of a guide connector within information handling system 10. Locating power portion 66 on an inner surface of guide pin 14 proximate to connector 38 helps to reduce the risk of inadvertent user or other contact with power portion 66.

Ground portion 64 interfaces with information handling system 10 before power portion 66 for connector detection.

Figure 7:
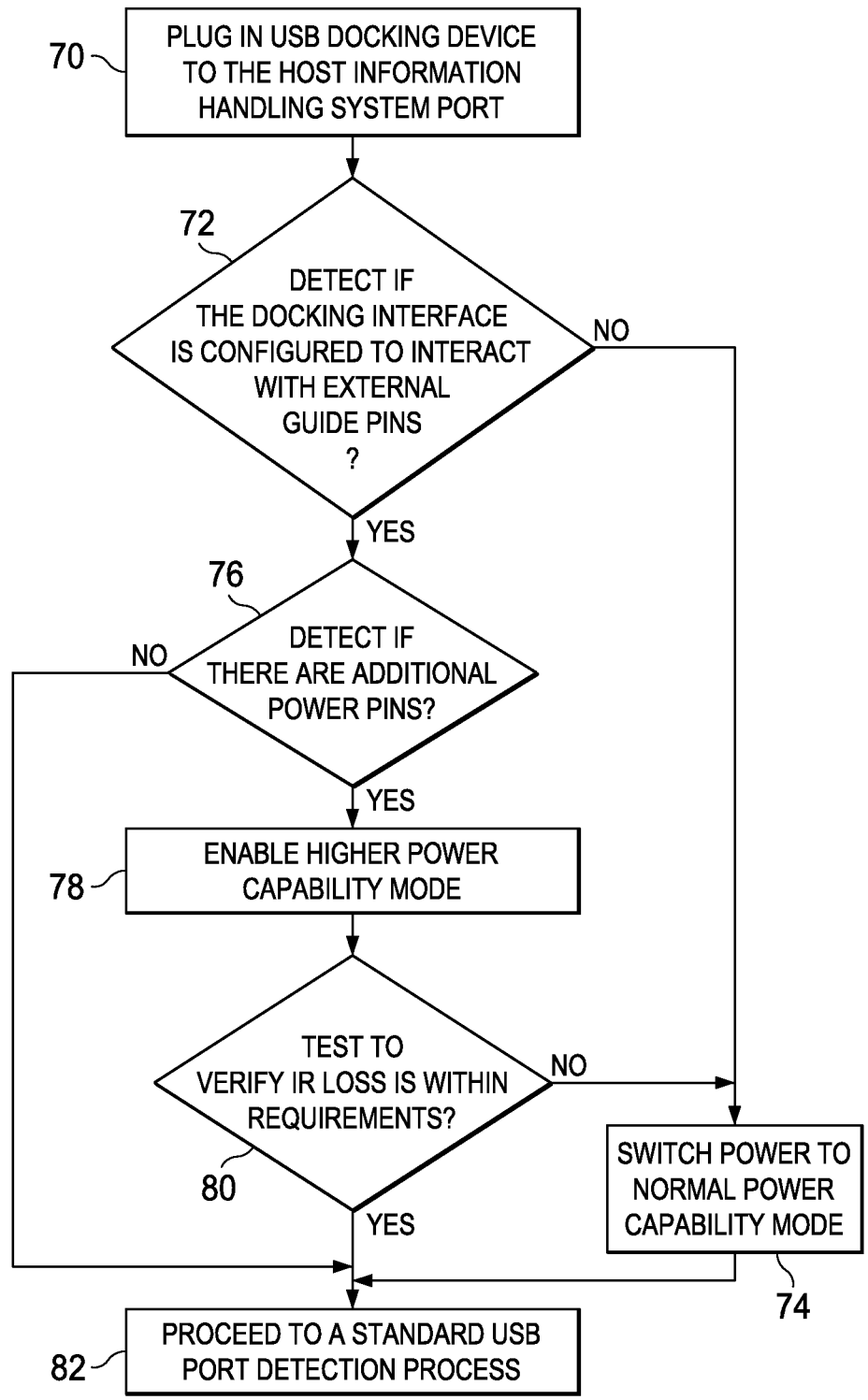
FIG. 7 depicts a flow diagram of a process for managing power transfers through a guide pin and guide connector based upon interactions at a proximately-located connector port.

Referring now to FIG. 7, a flow diagram depicts a process for managing power transfers through a guide pin and guide connector based upon interactions at a proximately-located connector port. The process starts at step 70 when a USB docking device is plugged into a host information handling system port, such as a USB Type C connector having guide pins disposed proximate but external to the standard USB form factor port. At step 72 a determination is made of whether the docking interface is configured to interact with external guide pins for power transfer. If not, the process continues to step 74 configure power transfer for normal USB-compatible capabilities enabled through the USB port and connector. The process then completes at step 82 to proceed with the standard USB port detection process. If at step 72 the docking interface is detected as configured to interact with external guide pins, the process continues to step 76 to detect if additional power pins are present. If not, the process continues to step 82. If additional power pins are present, the process continues to step 78 to enable the higher capacity power mode provided by power transfer through the guide pins. At step 80, a determination is made of whether the signal integrity loss is within data communication requirements with the external power transfer enabled. For example, power transfer through the USB cable but external to the USB serial interface may impact impedance matching of the serial interface and reduce signal integrity below acceptable levels that impact data transfer. Testing of data signal integrity may be performed based on test signals, test data transfers, or other methods. Testing may include the impact of reduced power transfer levels through the guide pins that enhance USB power delivery, the impact of full power transfer through the guide pins with and without USB power delivery, and various combinations of power levels on the guide pins and USB interface so that an optimized power transfer is available. If power transfer through the guide pins interferes with the data signal integrity level to an unacceptable degree, the process continues to step 74 to return to normal USB only power transfer. If external guide pin power transfer provides acceptable signal integrity, the process continues to step 82 to continue external guide pin power transfer while performing USB detection.

Figure 8:
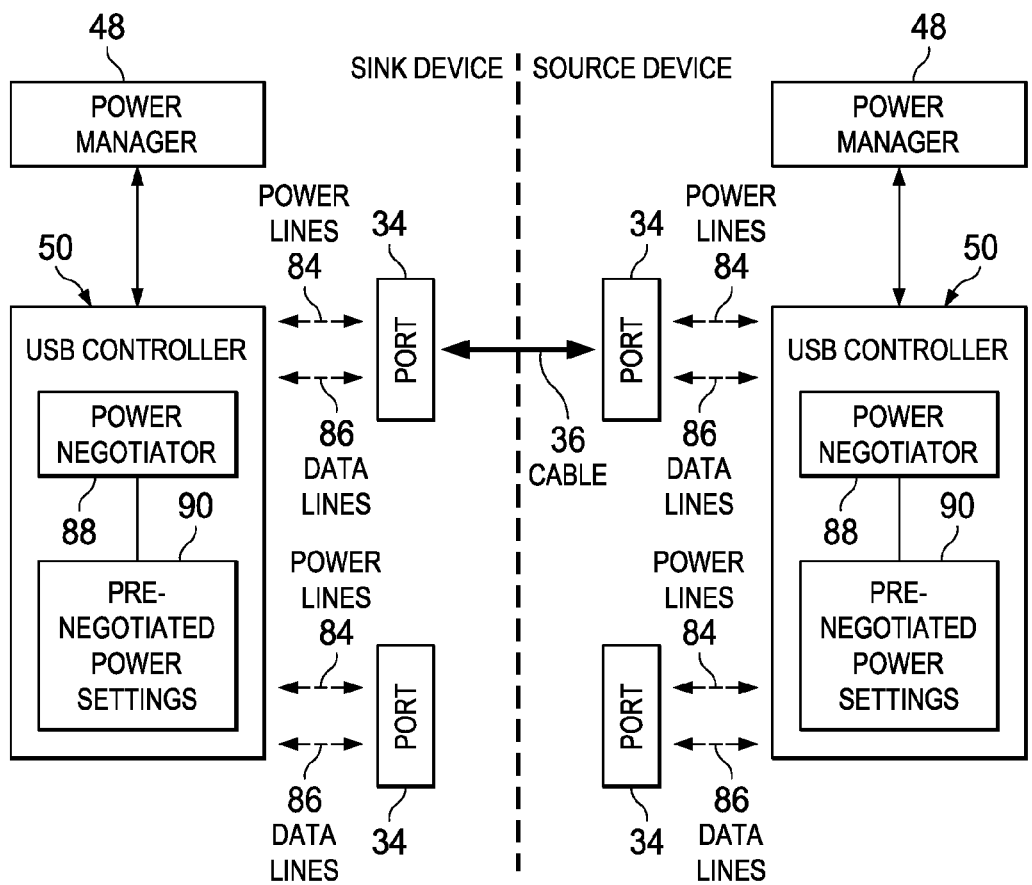
FIG. 8 depicts a block diagram of a system for pre-negotiation of power transfer with stored power transfer settings to rapidly change the direction of power transfers without a power protocol reset.

Referring now to FIG. 8, a block diagram depicts a system for pre-negotiation of power transfer with stored power transfer settings to rapidly change the direction of power transfers without a power protocol reset. Power Delivery Specification rev2.0 allows a power consumer (sink device) and a power provider (source device) to swap roles during normal power delivery so that the sink device becomes the source device and the source device becomes the sink device. The Power Delivery Specification power direction transition requires a hard reset to the power delivery communication protocol, negotiation of new power delivery role settings, and a reset of the power delivery after the role swap, all of which consumes time and causes a reset of data communications. In order to reduce the time needed for a power transfer direction change and to maintain data communications during the power transfer direction change, a power negotiator 88 pre-negotiates power transfer settings 90 for power transfer in each direction and stores the power transfer settings for use when a power transfer direction change is initiated. In the event of an unintentional or unexpected power direction transition, such as a detection of power loss from a source, pre-negotiated power settings 90 are applied to effect the power transfer direction change without performing a power reset. Upon a disconnection between the source and sink devices, pre-negotiated power settings 90 are deleted to prevent the use of invalid settings at a later time.

In the example embodiment depicted by FIG. 8, power and data transfers are supported across a cable 36 connected to ports 34 of a source device that provides power, such as a docking station, and a sink device that receives power, such as an information handling system. For instance, opposing USB controllers 50 negotiate data transfer across data lines 86 and power transfer across powers lines 84 in a conventional manner upon detection of physical connection at ports 34. However, after negotiating an initial power transfer role that defines an initial power transfer direction, such as from a docking station to an information handling system, power negotiators 88 pre-negotiate their respective roles and power capabilities as if power were to transfer in the direction opposite of the initial direction. The pre-negotiated power settings are saved and power transfer is initiated in the initial power transfer direction. During operation, power manager 48 at the sink device applies power received from the source device to provide power to local processing component, to another device through a separate port 34, or to charge a battery. If the source device loses power, power manager 48 of the sink device determines whether power is available for transfer (or if power transfer is desirable) and applies the pre-negotiated power settings 90 with USB controller 50 to reverse power transfer so that the sink device provides power to the source device with a role swap. For example, peripherals supported by the docking station may continue to operate when the docking station loses power because power is provided to the peripherals from the information handling system. Because power settings are pre-negotiated, the power direction change is enabled without a power protocol reset and related data reset. In one embodiment, if a second interface is established at a second port 34 with the same or a separate source device has pre-negotiated power settings 90, then power transfer to the sink device may continue essentially uninterrupted by applying pre-negotiated power settings 90 to initiate power transfer through the separate port 34. In one example embodiment, the second power source my include power provided from guide pins proximate to a port 34 as set forth above.

Figure 9A:
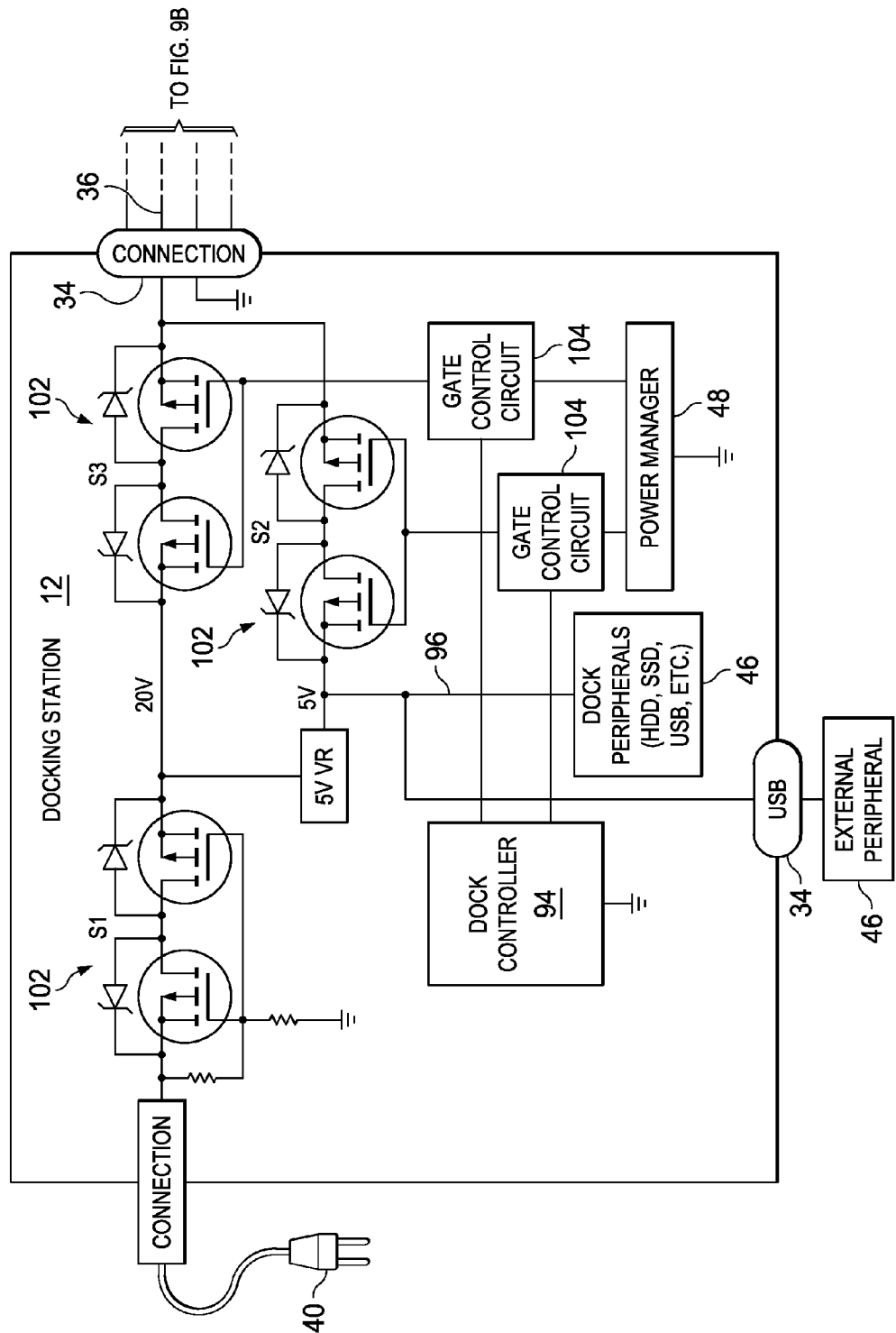
FIGS. 9A-9B (referred to generally as FIG. 9) depict a circuit block diagram of a system for power transfer direction change with pre-negotiated power transfer settings and power direction switches.
Figure 9B:
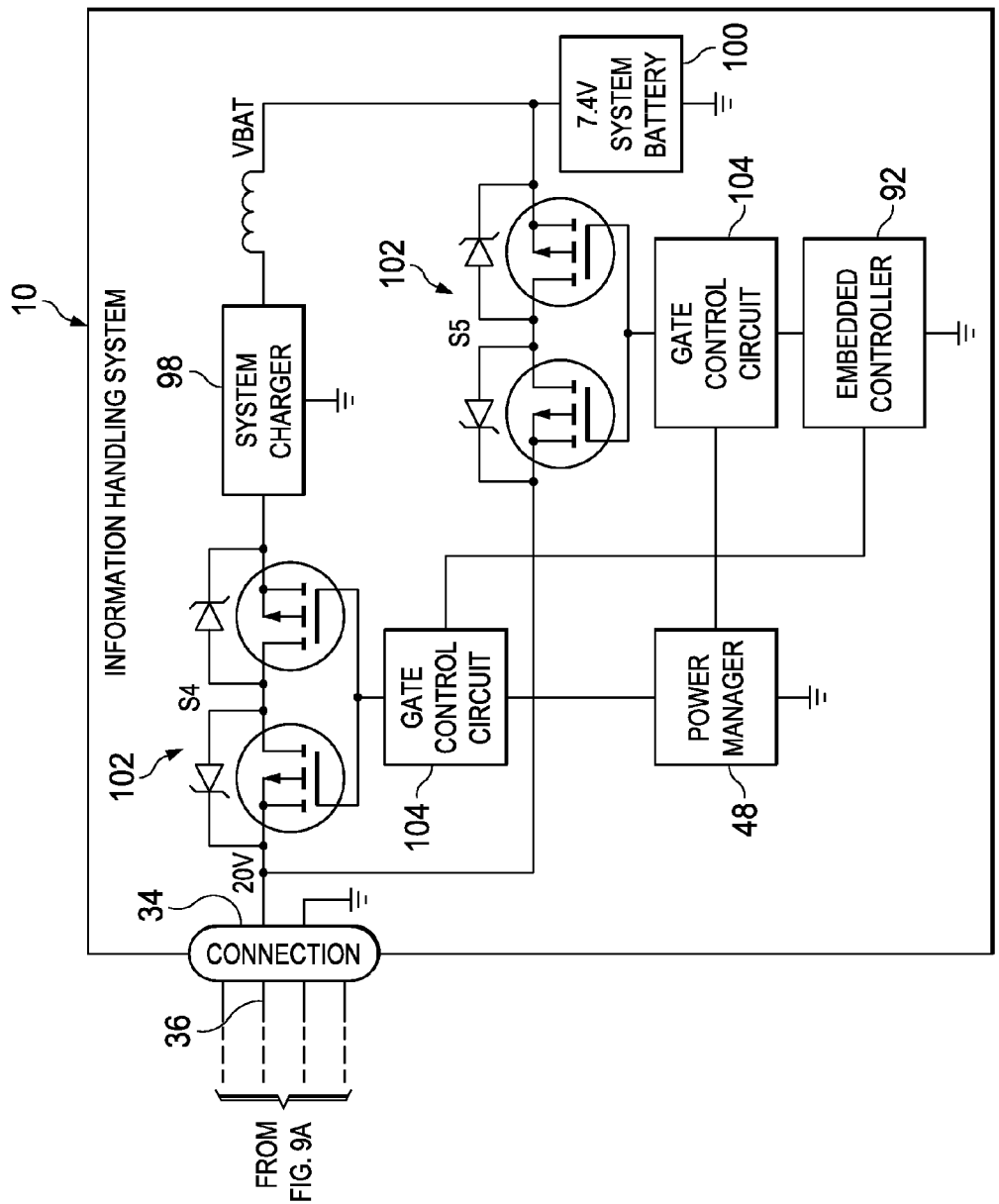

Referring now to FIG. 9, a circuit block diagram depicts a system for power transfer direction change with pre-negotiated power transfer settings and power direction switches. In the example embodiment, information handling system 10 interfaces with a docking station 12 through a cable 36 coupled between ports 34, such as a USB cable interfaced between Type C USB ports. An embedded controller 92 in information handling system 10 and a dock controller 94 in docking station 12 include firmware instructions that manage overall system operation, such as portions of a BIOS that store pre-negotiated power settings established upon initiation of the USB connection at ports 34. A power manager 48 in each of information handling system 10 and docking station 12 interfaces with embedded controller 92 and dock controller 94 respectively to direct power in an appropriate manner in the event power is sent or received at each system. Upon initial configuration, power settings are applied so that external power 40 received at docking station 12 is provided at approximately 20V to connector 34 for communication to information handling system 10. In addition, external power 40 is provided at 5V to run internal components of docking station 12, such as power rail 96 that powers dock controller 94, peripherals 46 power manager 48 and external peripherals 46 interfaced through a port 34, such as keyboard, mice, hard disk drives, etc. . . . interfaced through a USB port 34. Information handling system 10 receives power with 20V at port 34 and provides the power to a charger 98 that charges a battery 100. In one example embodiment, charger 98 applies receive power to a system power rail to run internal components and applies extra power to charger battery 100.

A set of power direction switches 102 are distributed at various points in the power paths of information handling system 10 and docking station 12 to rapidly change the direction of power transfer should power managers 48 apply pre-negotiated power settings 90. Gate control circuits 104 interface with power managers 48 so that power managers 48 may rapidly activate each power direction switch 102 to re-direction the flow of power, such as by changing the gate setting for a field effect transistor (FET) of each power direction switch 102. In the example embodiment, a command to change power direction closes the power direction switch 102 between port 34 and system charger 98 so that power no longer proceeds to system charger 98, and opens the power direction switch 102 between battery 100 and connector 34 so that power is available from battery 100 to connector 34. Similarly, gate control circuits 104 of docking station 12 close and open power direction switches 102 of docking station 12 so that power is accepted from information handling system 10 and provided to power rail 96. Power direction switches 102 may open and close as needed to direction power as either 20V or 5V through cable 36, depending upon pre-negotiated power settings. For example, in a typical configuration information handling system 10 will provide power at the lower voltage from battery 100; however, in some situations, such as when information handling system 10 has external power available from another power source, power switches 102 may configure to provide power through cable 36 to docking station 12 at 20V of power.

Figure 10:
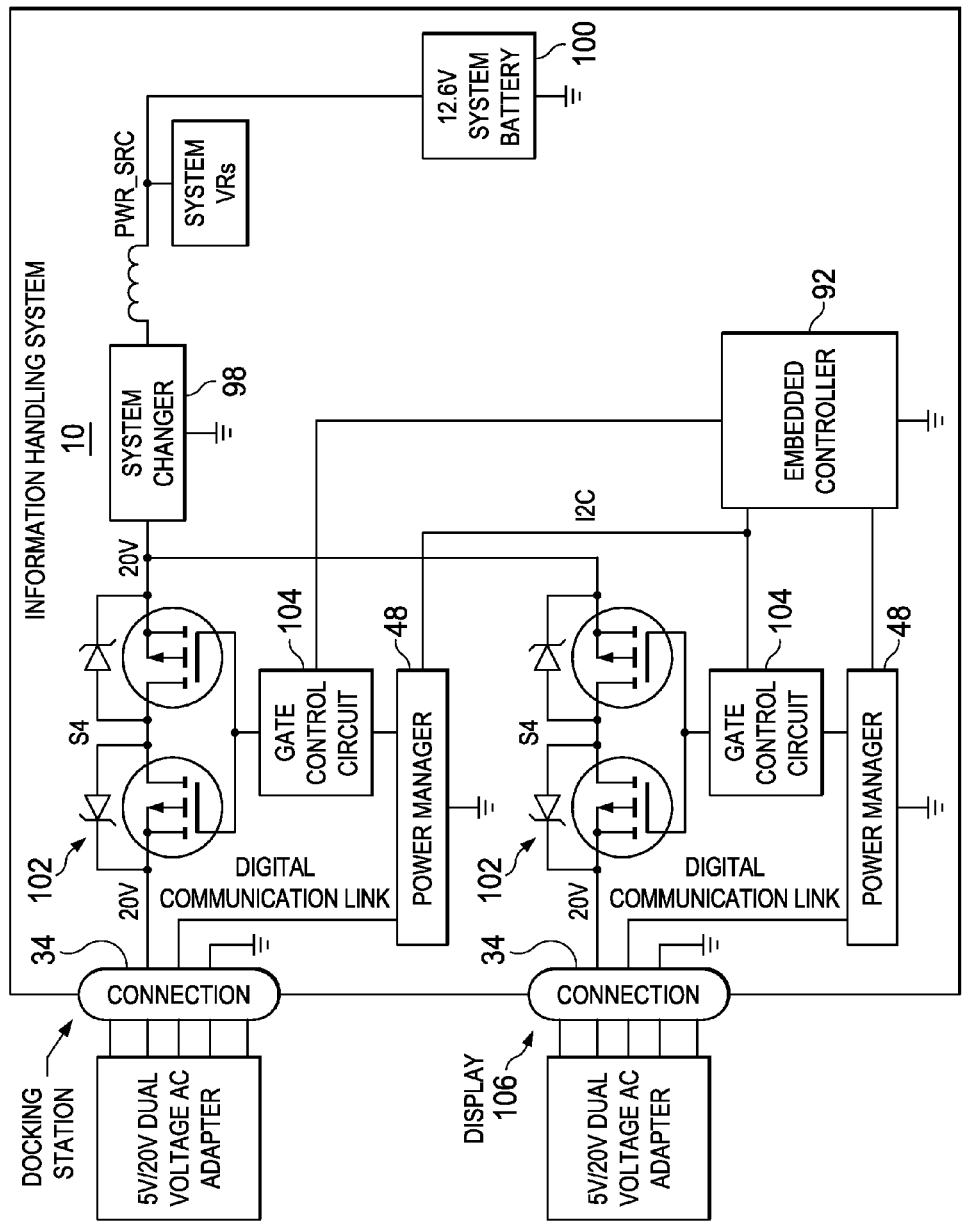
FIG. 10 depicts a circuit block diagram of an information handling system having pre-negotiated power transfer settings for multiple ports for rapid transition between the multiple ports.

Referring now to FIG. 10, a circuit block diagram depicts an information handling system 10 having pre-negotiated power transfer settings for multiple ports 34 for rapid transition between the multiple ports 34. As an example, information handling system 10 is coupled at a first port 34 to a docking station 12 that provides power and a display 106 at a second port 34 that is capable of providing power. The initial power configuration has power provided from docking station 12 through the first port 34 at 20V for use by system charger 98. During the power configuration setup at each of docking station 12 and display 106, pre-negotiated power settings are established and stored in power managers 48 associated with each port 34. If power is disconnected from docking station 12, embedded controller 92 and power managers 48 cooperate to establish power transfer from display 106 instead of docking station 12 by commanding gate control circuits 104 to close power transfer from docking station 12 and open power transfer from display 106. In various embodiments, various levels of power direction control may be applied by the pre-negotiated power settings so that power is directed in a desired manner at a desired transfer level. For example, docking station may provide power at 20V at a level sufficient to run information handling system 10 components and charge battery 100 while display 106 may provide power at 5 or 12V at a level sufficient only to run information handling system 10 components at a reduced power level. Alternatively, power from docking station 12 may be sufficient to charge battery 100 and also run display 106 while display 106 may have power sufficient for information handling system 10 but not sufficient to power docking station 12. In one example embodiment, power distribution is pre-negotiated based upon available power and information handling system 10 settings and stored for application as changes occur at information handling system 10. By storing pre-negotiated power settings, changes in power transfer direction are applied as needed without resetting power protocol settings or disrupting data communications, such as data communication across a USB interface.

Figure 11:
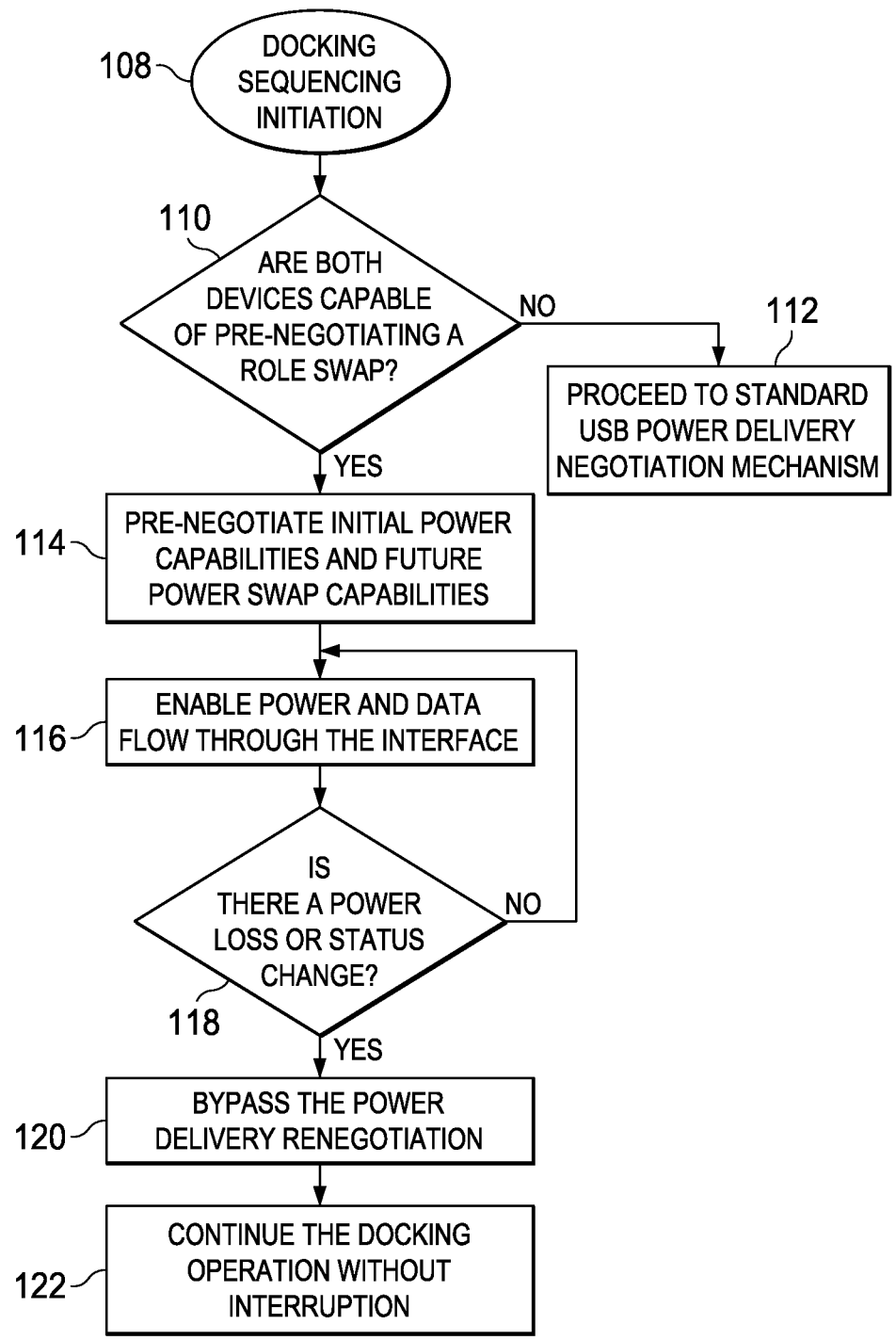
FIG. 11 depicts a flow diagram of a process for transitioning between power flow directions at a communications port without loss of data associated with the power direction transition.

Referring now to FIG. 11, a flow diagram depicts a process for transitioning between power flow directions at a communications port without loss of data associated with the power direction transition. The process begins at step 108 with a docking sequencing initiation or other coupling of a possible power source device to an information handling system 10, such as at a USB port. At step 110, a determination is made of whether the interfaced devices are each capable of pre-negotiating a power transfer role swap. If not, the process continues on to step 112 to proceed with a standardized power transfer negotiation mechanism, such as that defined by the USB specification. If at step 110 a determination is made that pre-negotiated power settings are supported at each interfaced device, the process continues to step 114 to pre-negotiate initial power capabilities for each device to provide power to the other device to support power direction swap capabilities. At step 116, power and data transfer is initiated through the device interface according to the initial configuration. At step 118, a determination is made of whether a power loss or other power status has changed from the initial configuration. If not, the process returns to step 116 to continue monitoring power transfer status. If at step 118 a power loss or status change is detected, the process continues to step 120 to bypass the power delivery negotiation process by proving the pre-negotiated power settings instead, such as by providing pre-negotiated power settings to a USB controller instead of initiating a reset of the USB interface. At step 122, the pre-negotiated power settings are applied to establish a power transfer, such as in an opposite direction, without a reset of the power transfer protocol or data transfer at the interface.

Figure 12:
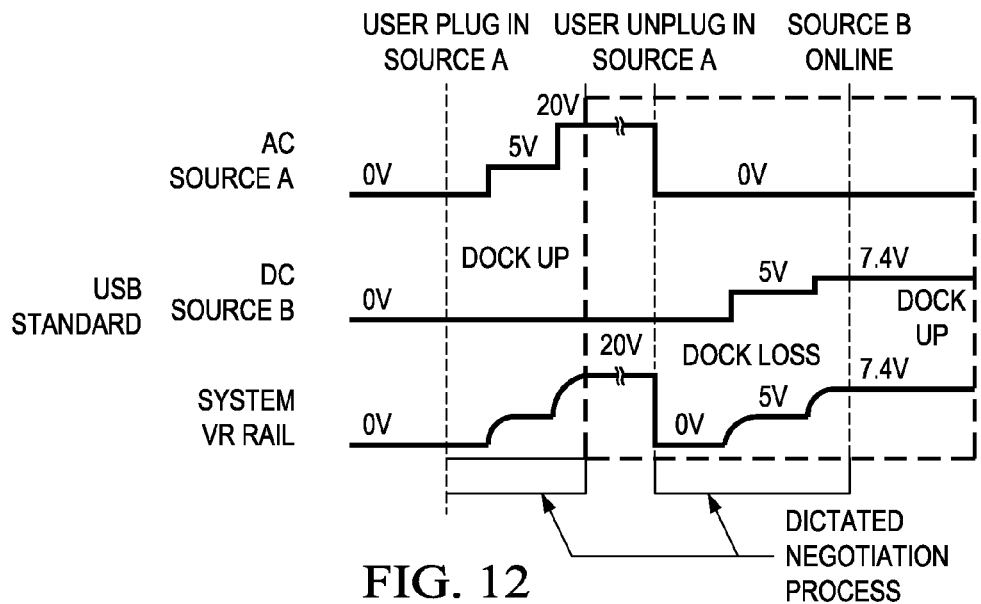
FIG. 12 depicts a time response for power transfer with power transfer settings negotiated at each change in direction of power flow.
Figure 13:
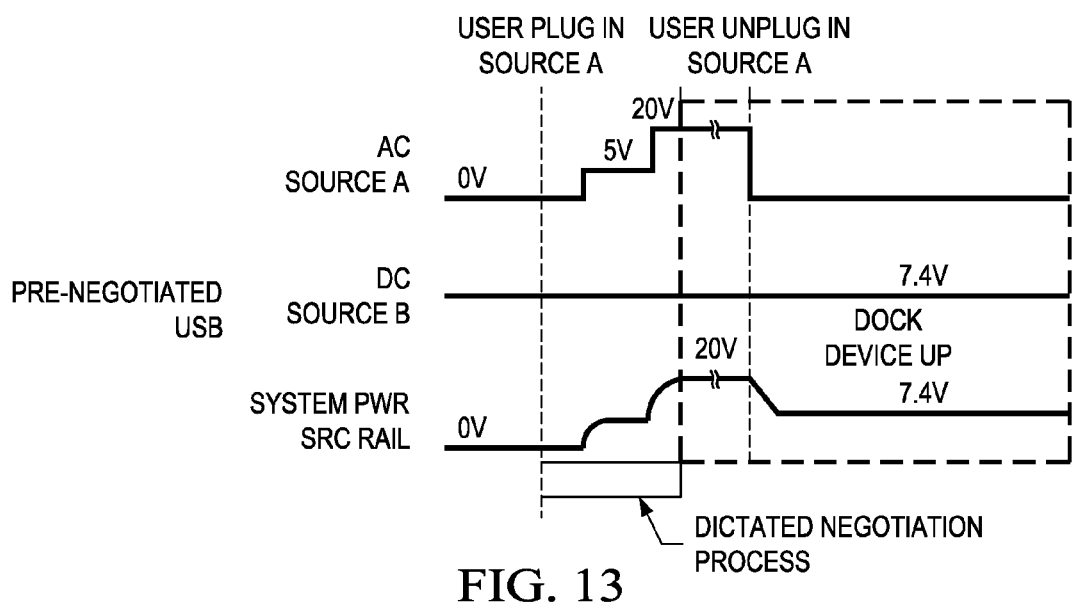
FIG. 13 depicts a time response for power transfer with pre-negotiated power transfer settings to support a change in power transfer direction.
Figure 14:
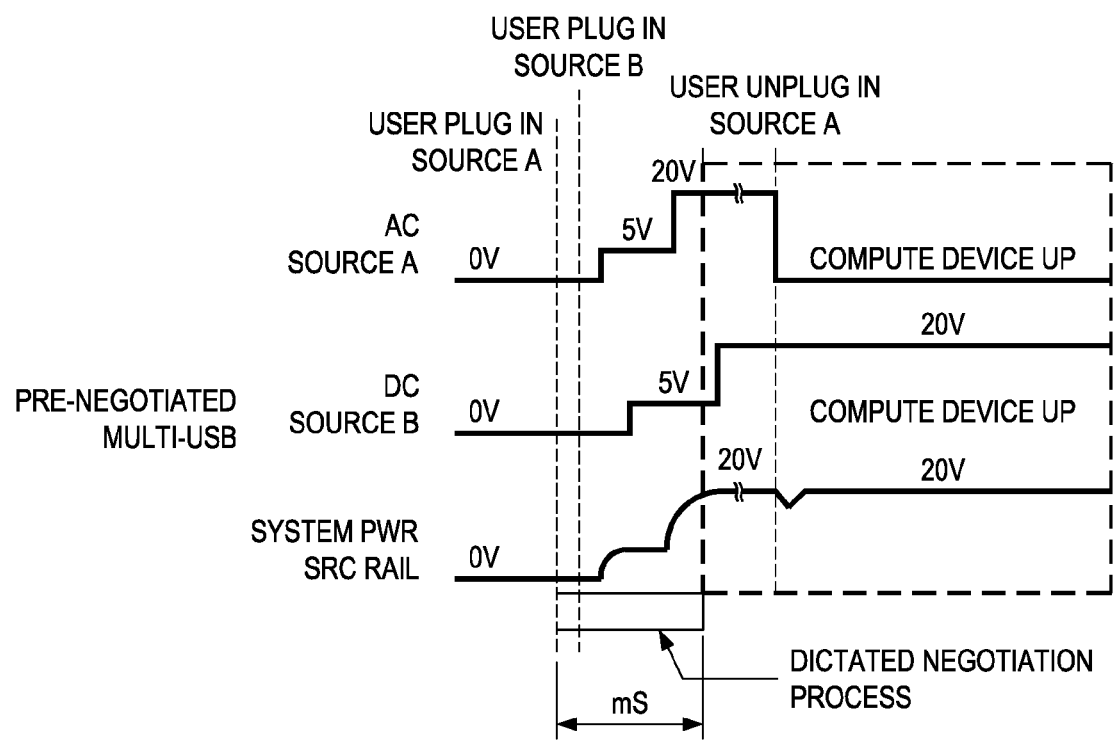
FIG. 14 depicts a time response for power transfer with pre-negotiated power transfer settings to support a change in power supply between multiple communication ports.

Referring now to FIGS. 12, 13 and 14, a time response for power transfer direction and source changes is depicted with power transfer settings negotiated at each change in direction of power flow and pre-negotiated before changes in direction or source. FIG. 12 depicts a USB standardized power negotiation that takes place over X mSec to establish power, such as at 20V from a docking station source A, followed by a second power negotiation that takes place over X mSec to establish power from source B, such as power transfer in an opposite direction to the docking station. Over time of the power negotiation, a data loss occurs across the USB interface. By comparison, FIG. 13 depicts a single power negotiation that address power transfer in both directions across the USB link. When a power disruption occurs, a near-instantaneous power transfer direction change is applied with pre-negotiated power settings to provide 7.4V in the opposite direction. Because the power protocol is not reset, data transfer across the USB interface continues uninterrupted during the change in power transfer direction. Similarly, FIG. 14 depicts the application of pre-negotiated power settings for multiple external devices that provide power to an information handling system. If power is disrupted from a source A, pre-negotiated power settings for source B allow rapid transition to power supplied from source B without a data transfer disruption.

Figure 15:
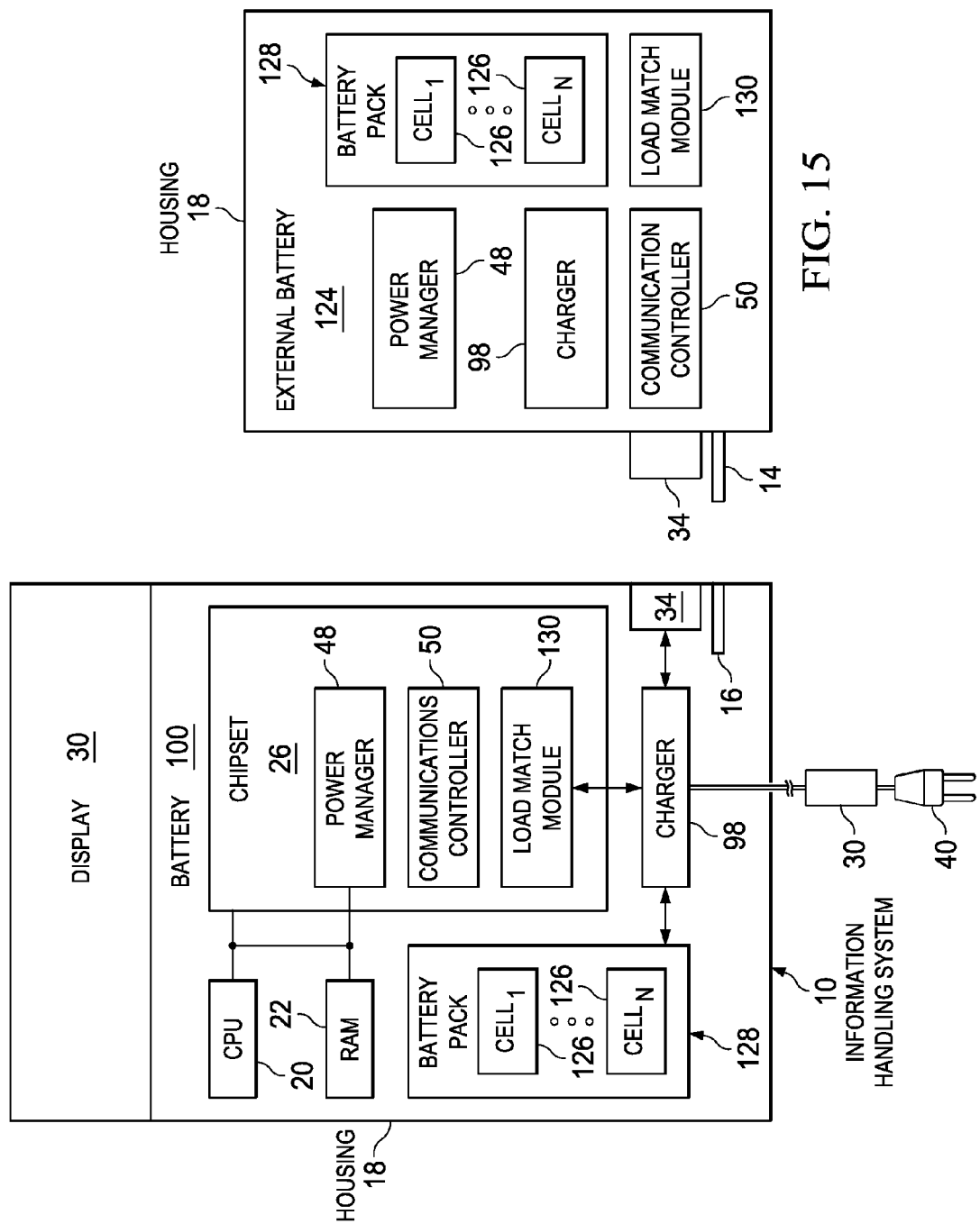
FIG. 15 depicts a block diagram of a system for transfer of power between an external battery and an information handling system at voltages selected based on information handling system load.

Referring now to FIG. 15, a block diagram depicts a system for transfer of power between an external battery 124 and an information handling system 10 at voltages selected based on information handling system load. Information handling system 10 processes information with a CPU 20 and RAM 26 power under the management of a power manager 48 running in a chipset 26. For example, power manager 48 coordinates power supplied from an external power source 40 and adapter 30, from an internal battery 100 and/or from power provided by a connector port 34, such as a USB connector port configured with a guide connector 16 that accepts power from a guide pin 14. A charger 98 under the control of power manager 48 applies extra power available from external power sources to charge battery 100. Charger 98 includes internal circuitry to adjust voltage levels of power available from external power sources to a voltage level appropriate for battery 100. For example, an information handling system battery typically includes a battery pack 128 that has plural lithium ion battery cells 126 connected in a combination of parallel and series connections to provide a desired available current at a desired native voltage, such as a voltage range of between 12 and 14 Volts. External power is generally provided to charger 98 at a level above the native voltage so that charger 98 has flexibility in the voltage provided to battery 100. In an example embodiment, external power provided through connector port 34 and from adapter 30 is provided at approximately 19 Volts so that charger 98 can step the voltage down to the native voltage of battery 100 with an increased current provided for a more rapid charge. In an alternative embodiment, power may also be provided at a lower voltage, such as 5 Volts, and then stepped up at a lower current to charge battery 100. Generally, power manager 48 coordinates a supply of power for use by CPU 20 and other processing components at approximately 5 Volts by stepping power down from voltage levels provided by battery 100 or external power.

An external battery 124 is disposed proximate to information handling system 10 and includes a stored charge from a rechargeable battery pack 128 that can provide power to information handling system 10 for recharge of battery 100 or for operating processing components with the external power. External battery 124 includes a connector port 34 to interface with the connector port 34 of information handling system 10, either with a direct port-to-port connection or through a cable, such as a USB cable. In the example embodiment, external battery 124 includes a guide pin 14 that interfaces with a guide connector 16 to provide additional power transfer capability as set forth above. When external battery 124 interfaces with information handling system 10 through connectors 34, power managers 48 coordinate power transfers by chargers 98 with communications provided through communications controllers 50, such as USB controllers. Under normal operating conditions, power managers 48 first looks to provide power from external battery 124 to charge information handling system 100 at a rapid rate, such as with a power transfer at 19V. If battery 100 has a full charge, external battery 124 provides power to charger 98 through connector port 34 using the connector port power transfer protocol so that information handling system 10 runs with power from external battery 124 rather than internal battery 100. If information handling system 10 has external power available and a full charge on battery 100, then power managers 48 coordinate a power transfer from information handling system 10 to external battery 124 to charge its battery pack 128.

A load match module 130 on information handling system 10 and external battery 124 coordinates voltage levels for power transfers between information handling system 10 and external battery 124 through communications controllers 50 and under the management of power managers 48. Load match module 130 evaluates the power state of information handling system 10 and external battery 124 to determine an appropriate voltage for power transfer, such as based upon the availability of external power, the charge state of battery 100, the charge state of battery pack 128 and the load generated by components running on information handling system 10, such as the power consumption of CPU 20, RAM 22 and display 30. Although external battery 124 can provide greater amounts of power to information handling system 10 at a boosted voltage, such as 19V, the transformation of power from a native voltage of battery pack 128 to a boosted voltage introduces inefficiencies that reduce the total amount of power available for transfer if the transfer takes place at a native voltage of battery pack 128. A similar impact on power efficiency takes place when power transfers from information handling system 10 to external battery 124. Load match modules 130 coordinate a power transfer at a boosted voltage if the power load of information handling system 10 is above a threshold at which power transfer at a native voltage will not be adequate to run information handling system 10. Load match modules coordinate power transfer at a lower voltage, such as the native voltage of battery pack 128, if the load present on information handling system 10 is below the boosted threshold so that adequate power is available at the reduced voltage to meet the power needs of information handling system 10. In one embodiment, power pins within connector port 34 are set up to transfer power at one of the boosted or native voltage while guide pin connector 16 and guide pin 14 are set up to transfer power at the other of the boosted and native voltage. In such an embodiment, load match module 130 selects the appropriate power interface for power transfer as power load changes on information handling system 10. As is set forth above in greater detail, pre-negotiated power transfer settings may be applied to change power transfer parameters as the load of information handling system 10 changes, either with a single existing connection or by selecting between power transfer pins within connector port 34 and at guide pin connector 16. As an example, load match modules 130 coordinate a boosted voltage power transfer through a guide pin connection on an initial connection with external battery 124 until battery 100 has a full charge, and then coordinates a native voltage power transfer through power pins of connector port 34 during periods of low power load at information handling system 10. If load match modules 130 detect an increase in power load at information handling system 10, pre-negotiated power settings are applied to adjust connector port 34 to provide a rapid transition from native to boosted voltage, or, alternatively, power transfer is shifted to the guide pin connections at the boosted voltage.

Figure 16:
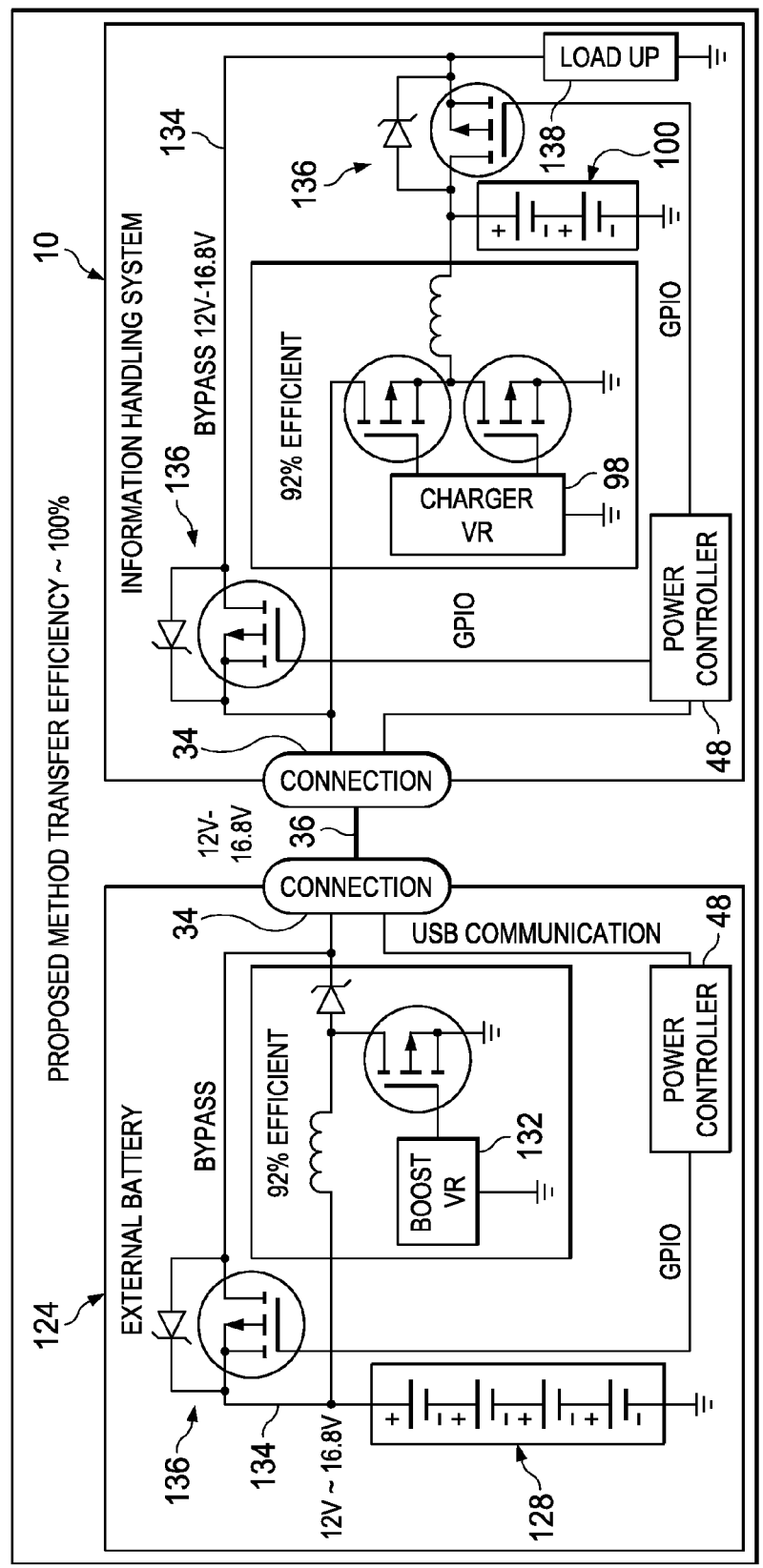
FIG. 16 depicts a circuit block diagram of a system for transfer of power between an external battery and an information handling system with a selective bypass of a voltage boost circuit.

Referring now to FIG. 16, a circuit block diagram depicts a system for transfer of power between an external battery 124 and an information handling system 10 with a selective bypass of a voltage boost circuit 132. External battery 124 includes a battery pack 128 that provides a native voltage of 12 to 16.8V to a voltage boost circuit 132 or, alternatively, to a bypass circuit 134. Power controller 48 of external battery 124 communicates through connector ports 34 and cable 36 with a power controller 48 of information handling system 10 to establish a transfer voltage for power transfer based upon a load 138 running on information handling system 10. In one example embodiment, power controllers 48 coordinate communication from battery pack 128 through voltage boost circuit 132 or bypass circuit 134 by selectively engaging a bypass switch 136 to disallow or allow power transfer through bypass circuit 134 as desired. When power transfer is performed at a boosted voltage by interfacing battery pack 128 with voltage boost circuit 132, an efficiency of approximately 92% occurs in the power transformation. In addition, the boosted voltage arrives at information handling system 10 charger 98 where it is stepped down to a native voltage of battery 100 with an efficiency of approximately 92%. Thus, overall power transfer efficiency at a boosted voltage is approximately 85%. In contrast, a near 100% power transfer efficiency is provided by transferring power from battery pack 128 of external battery 124 at its native voltage through bypass circuits 134 and around chargers 98 to battery 100 or load 138. Similar power efficiencies are provided in the event that information handling system 10 receives external power and charges external battery 134 with a boosted or native voltage.

The determination of whether to use boosted or native voltage is made by power controllers 48 communicating through cable 36, such as with the USB protocol. If a rapid power transfer is desired, such as where battery 100 has a low charge, the boosted voltage is initially applied. If a large load 138 is generated by information handling system 10, the boosted voltage is commanded, such as when processor intensive operations are being performed. If load 138 drops to a level that is supported by native voltage of battery pack 128, bypass switches 136 are activated to provide power through the bypass circuits 134. Power controllers 48 apply stored pre-negotiated power settings to change power levels and power direction responsive to changes in load 138. If more than one power interface is available, such as guide pin and connector power interface, the different power interfaces may be engaged as needed to support the different power transfer levels. One advantage of the communication between power controllers 48 is that charging of one or more external batteries is managed more efficiently with communication supported by power controllers 48. For example, charger 98 in information handling system 10 may provide boosted or native voltages to charger daisy chained external batteries.

Figure 17:
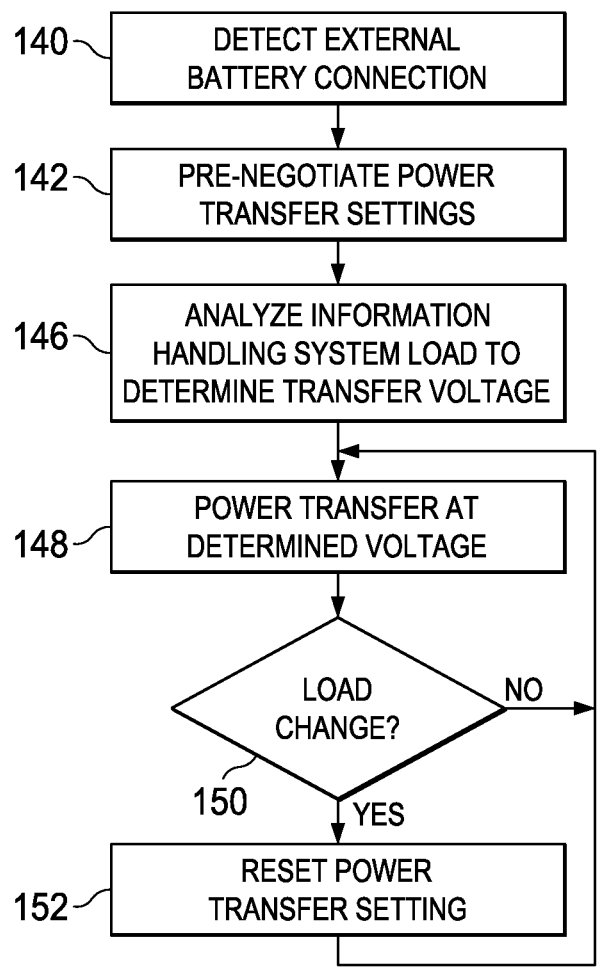
FIG. 17 depicts a flow diagram of a process for selecting a voltage to perform power transfer between an external battery and information handling system.

Referring now to FIG. 17, a flow diagram depicts a process for selecting a voltage to perform power transfer between an external battery and information handling system. The process starts at step 140 with detection of an external battery connection at an information handling system. At step 142, power transfer settings to and from the external battery are pre-negotiated to prepare for power transfer. At step 146, an analysis of the information handling system load is performed to determine a transfer voltage for transfer of power from the external battery. The load may be based on actual power usage detected at the system or on additional factors, such as battery charge. Once a power transfer voltage is determined, the process continues to step 148 to perform power transfer at the determined voltage. At step 150, a determination is made of whether the load at the information handling system has changed. If not, the process returns to step 148 to continue power transfer. If at step 150 the load has changed, the process continues to step 152 to reset the power transfer settings for a new transfer voltage and then returns to step 148 to transfer power at the new transfer voltage.

Figure 18:
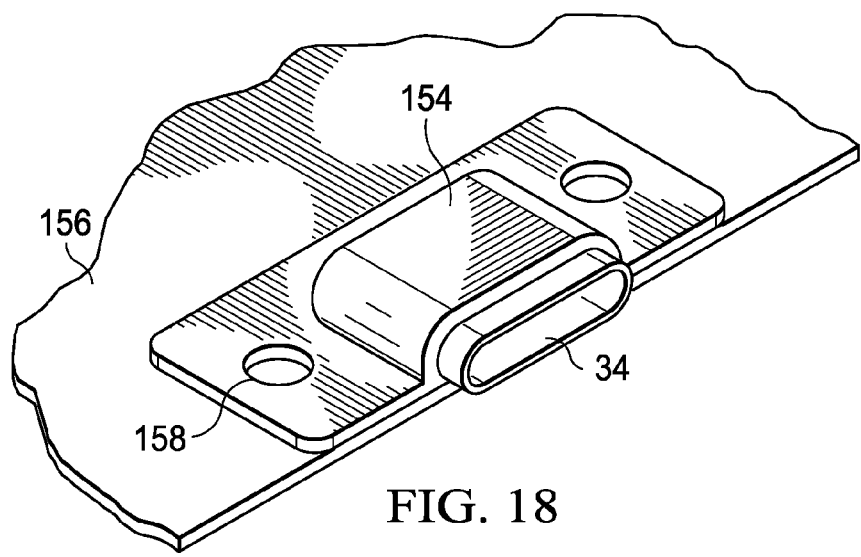
FIG. 18 depicts a side perspective view of a connector port supported in a connector shell that interfaces with an information handling system motherboard.

Referring now to FIG. 18, a side perspective view depicts a connector port 34 supported in a connector shell 154 that interfaces with an information handling system motherboard 156. In the example embodiment, connector port 34 is a USB Type-C connector as depicted in FIG. 3 above, which fits into a cavity formed in connector shell 154. Coupling points 158 are defined at the base of connector shell 154 to couple with motherboard 156 to fixedly engaged connector shell 154 to motherboard 156, such as with screws, solder or other secure coupling devices. Connector port 34 releaseably couples to connector shell 154 so that a replacement connector port 34 may be inserted if an installed connector port 34 is damaged. By coupling a robust connector shell 154 to motherboard 156, excess forces applied to the relatively fragile connector port 34 will tend to damage a replaceable connector port 34 instead of motherboard 156, which requires system replacement on failure.

Figure 19:
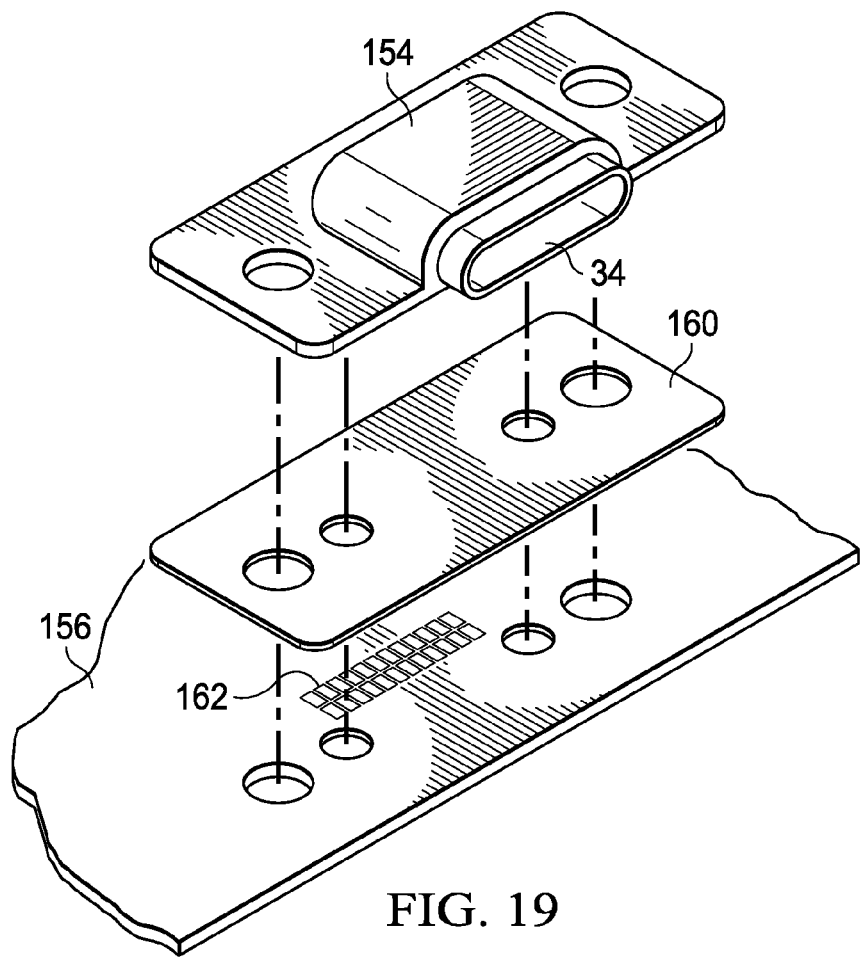
FIG. 19 depicts a blow-up view of the connector port and connector shell assembly.

Referring now to FIG. 19, a blow-up view depicts the connector port 34 and connector shell 154 assembly. A Z-tape electrical bridge 160 is disposed between conductive pads on the bottom of connector shell 154 and conductive pads 162 disposed on motherboard 156 to conduct electrical signals from connector 34 to motherboard 156. For example, Z-tape electrical bridge 160 is 3M 9703 Z-Tape designed to conduct electrical signals in the Z direction, i.e., vertically between aligned conductive pads of connector shell 154 and pads 162 but not laterally between conductive pads on the same surface. Alternatively, spring clips may be used instead of conductive pads at either motherboard 160 or the bottom of connector shell 154. Screws or other types of secure coupling devices firmly hold connector shell 154 against motherboard 156 so that the parallel flat opposing surfaces of connector shell 154 and motherboard 156 provide a robust permanent attachment. In turn, connector shell 154 securely but releaseably holds connector 34 in place to have an electrical signal interface with motherboard 156. If damage occurs to connector 34, it is removed and replaced with another connector without requiring repairs at motherboard 156.

Figure 20:
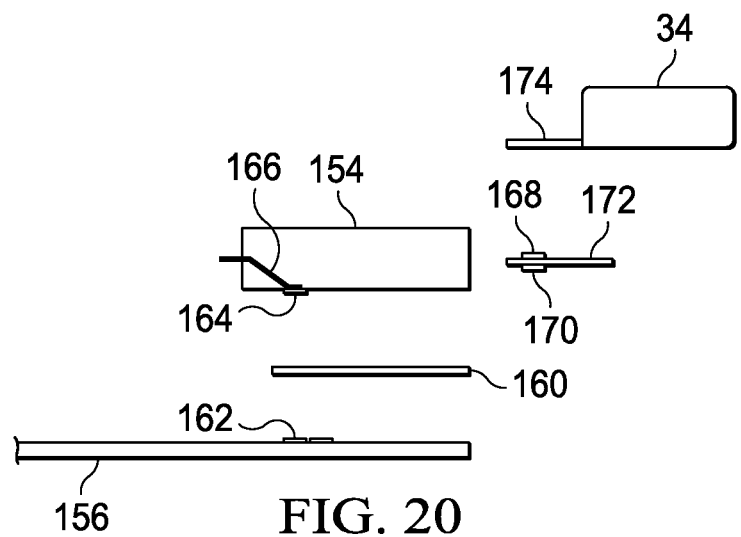
FIG. 20 depicts a side cutaway blow-up view of the connector port and connector shell.

Referring now to FIG. 20, a side cutaway blow-up view depicts the connector port 34 and connector shell 154. A connector shell pad 164 aligns with a motherboard pad 162 to conduct electrical signals through conductive tape 160 when a coupling device brings conductive shell 154 into contact with motherboard 162. A release actuator 166 extends outward from connector shell 154 to provide a removal force against a connector 34 installed in connector shell 154. Release actuator 166 provides a biasing force against an installed connector 34 to maintain the connector in connector shell 154 until release actuator 166 is activated. A connector port "dive" board 172 inserts into connector shell 134 with an upper interface 168 that couples to pins of connector port 34 and a lower interface 170 that couples to pads 164 of connector shell 154. Connector port dive board 172 is fixed into place in connector shell 154, such as with solder, so that upper interface 168 aligns with connector port pins 174 to conduct electrical signals from connector port 34 through connector port dive board 172 and to motherboard 156. If damage occurs to connector port pins 174 due to connection force or other forces at connector port 34, then connector port 34 is removed by activation of release actuator 166 and replaced with an intact connection port.

Figure 21:
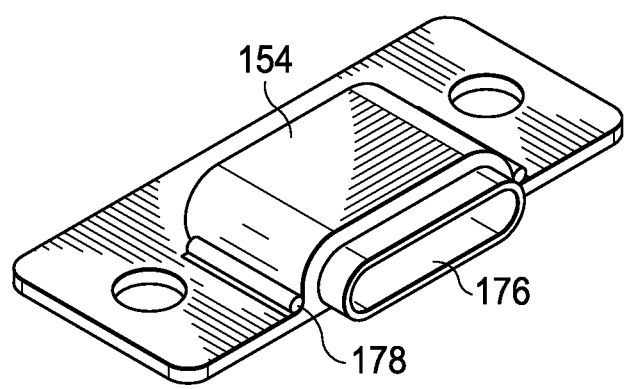
FIG. 21 depicts a connector port shell with a cavity prepared to accept a connector port.

Referring now to FIG. 21, a connector port shell 154 is depicted with a cavity 176 prepared to accept a connector port. On each side of cavity 176 a guide connection shell 178 is included to accept a guide pin as set forth above that transfers power proximate but external to connector port 34. Including guide connection shell 178 with the connector port shell 154 provides a robust solution for coupling a connector pin of a cable to the information handling system in a secure and repeatable manner while also including electrical interfaces for transferring power received from a guide pin as set forth above.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions that process information;
memory disposed in the housing and interfaced with the processor, the memory operable to store the instructions and information;
a power manager disposed in the housing and operable to manage power applied to the processor and memory;
a communications controller interfaced with the processor and the power manager, the communications controller operable to manage an interface with an external device to communicate power and data with the external device;
a connector port disposed at the housing and interfaced with the communications controller, the connector port having data and power pins to interface data and power with the external device through a connector cable;
a power negotiator interfaced with the communications controller and operable to negotiate power settings for power transfer to and from the external device and to store the power settings for application by the communications controller;
a docking station coupled with the connector port as the external device;
one or more peripherals coupled to the docking station and interfaced with the connector port through the docking station;
wherein the communications controller selectively receives power from the docking station and provides power to the docking station with the power settings, the power provided to the docking station used at the docking station to power the one or more peripherals;
a charge controller disposed in the housing and operable to provide power from an external source for use by the power manager;
a battery disposed in the housing and operable to provide power for use by the power manager, the battery interfaced with the charge controller to accept a charge when the charge controller interfaces with an external source;
a first power direction switch disposed between the port and the charge controller and interfaced with the power manager;
a second power direction switch disposed between the port and the battery and interfaced with the power manager;
wherein the power manager turns off the first power direction switch and on the second power direction switch to change the direction of power between the external device and information handling system.

2. The information handling system of claim 1 wherein the communications controller is further operable to apply the power settings to change the direction of power communication without a reset.

3. The information handling system of claim 2 wherein the communications controller comprises a Universal Serial Bus controller.

4. The information handling system of claim 1 further comprising first and second connector ports disposed at the housing, each connector port having data and power pins to interface data and power with first and second external devices through a connector cable coupled to each connector port, wherein:
the power negotiator is further operable to negotiate power settings for power transfer to and from first and second external devices and to store the power settings for application by the communications controller; and
the communications controller is further operable to apply the power settings to establish power transfer with the second external device if power transfer is interrupted with the first external device.

5. The information handling system of claim 1 further comprising:
at least one guide connector proximate the connector port and operable to accept power from a guide pin;
wherein the power negotiator is further operable to negotiate power settings for power transfer to and from the external device through the guide connector and to store the power settings for application by the communication controller; and
wherein the communications controller is further operable to apply the power settings to establish power transfer to and from the external device with the guide connector if power transfer through the connector port is interrupted.

6. The information handling system of claim 1 wherein the first and second power direction switches comprise field effect transistors managed by a gate control circuit.

7. The system of claim 1 wherein the power manager is further operable to detect a disconnection of the external device from the port and, in response to delete the power settings.

8. A method for transferring power between an information handling system and external device through a communications port, the method comprising:
detecting insertion of a connector into the communications port of the information handling system, the connector interfaced with the external device;
exchanging power capabilities between the information handling system and external device through the communications port;
negotiating first power transfer settings for power transfer from the external device to the information handling system through the communications port;
pre-negotiating second power transfer settings for power transfer from the information handling system to the external device through the communications port;
storing the pre-negotiated second power transfer settings; and
initiating power transfer from the external device to the information handling system with the first power settings;
detecting a predetermined condition; and
in response to the predetermined condition, applying the stored pre-negotiated second power transfer settings to initiate power transfer from the information handling system to the external device,
wherein the predetermined condition comprises an interruption of power transfer from the external device to the information handling system.

9. The method of claim 8 further comprising powering peripherals interfaced with the external device with power provided from the information handling system.

10. The method of claim 9 wherein the communications port comprises a USB port.

11. The method of claim 8 further comprising:
  detecting a disconnection of the connector from the communications port; and
  in response to the detecting a disconnection, deleting the pre-negotiated second power transfer settings.

12. The method of claim 8 wherein power is initiated from the information handling system to the external device without a power transfer reset.

13. A system for transferring power between an information handling system and an external device through a communications port, the system comprising:
  a communications port configured to integrate in the information handling system, the communications port having power pins for communicating power and data pins for communicating data;
  a power negotiator interfaced with the communications port and operable upon detection of an external device connection to the communication port to negotiate first power transfer settings to transfer power from the external device to the information handling system and second power transfer settings to transfer power from the information handling system to the external device, the power negotiator saving the first and second power transfer settings;
  a power manager interfaced with the power negotiator, the power manager operable to command power transfer to the information handling system with the first power transfer settings and to command power transfer from the information handling system with the second power transfer settings; and
  first and second power direction switches interfaced with the power manager and operable to configure the information handling system to transition between receiving power and sending power when the power manager applies the first power transfer settings and the second power transfer settings.

14. The system of claim 13 wherein the power negotiator is further operable to delete the first and second power transfer settings upon detection of a disconnection of the external device from the communication port.

15. The system of claim 13 further comprising first and second communication ports, wherein the power negotiator is further operable to negotiate first and second power transfer settings for a first external device coupled to the first communications port and for a second external device coupled to the second communications port.

16. The system of claim 15 wherein the power manager is further operable to selectively command power transfers to and from the information handling system for the first and second external devices by applying the first and second power transfer settings for each external device without resetting power transfer between the information handling system and the first and second devices.

* * * * *